US012609858B2

(12) United States Patent
Cho et al.

(10) Patent No.: US 12,609,858 B2
(45) Date of Patent: Apr. 21, 2026

(54) ELECTRONIC DEVICE FOR OUTPUTTING WIRELESS SIGNAL BASED ON CHIRP SIGNAL BY MODIFYING FREQUENCY OF FREQUENCY SYNTHESIZING CIRCUIT AND METHOD THEREOF

(71) Applicant: SAMSUNG ELECTRONICS CO., LTD., Suwon-si (KR)

(72) Inventors: Namjun Cho, Suwon-si (KR); Junghwan Son, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 17/966,546

(22) Filed: Oct. 14, 2022

(65) Prior Publication Data

US 2023/0120237 A1    Apr. 20, 2023

Related U.S. Application Data

(63) Continuation of application No. PCT/KR2022/013259, filed on Sep. 5, 2022.

(30) Foreign Application Priority Data

Oct. 15, 2021    (KR) ........................ 10-2021-0137927
Dec. 16, 2021    (KR) ........................ 10-2021-0180680

(51) Int. Cl.
　　*H04L 27/26*　　　(2006.01)
　　*H04L 7/00*　　　　(2006.01)
　　*H04L 27/10*　　　(2006.01)
(52) U.S. Cl.
　　CPC ........ *H04L 27/2657* (2013.01); *H04L 7/0025* (2013.01); *H04L 27/103* (2013.01)

(58) Field of Classification Search
　　CPC .................................................. H04L 27/2657
　　See application file for complete search history.

(56) References Cited

U.S. PATENT DOCUMENTS 5,859,570 A * 1/1999 Itoh ........................ H03D 7/161
　　　　　　　　　　　　　　　　　　　　　331/25
7,003,274 B1　2/2006 Olip
　　　　　　　　(Continued)

FOREIGN PATENT DOCUMENTS

IT　　　　PI20 070053 A1　10/2008
JP　　　　5219873 B2　　3/2013
　　　　　(Continued)

OTHER PUBLICATIONS

International Search Report dated Dec. 16, 2022 for PCT/KR2022/013259.
　　　　　　　　(Continued)

*Primary Examiner* — Abdeltif Ajid
(74) *Attorney, Agent, or Firm* — Nixon & Vanderhye P.C.

(57) ABSTRACT

In an embodiment, an electronic device may include a first frequency synthesizing circuit outputting a second electronic signal from a first electronic signal, a second frequency synthesizing circuit outputting a fourth electronic signal for converting a frequency of a third electronic signal obtained from the first electronic signal based on the second electronic signal, and a communication processor. The communication processor may be configured to transmit, to the first frequency synthesizing circuit, a first parameter indicating a frequency of the second electronic signal, and changing based on a first preset frequency interval according to a first preset period. The communication processor may be configured to transmit, to the second frequency synthesizing circuit, a second parameter indicating a frequency of the fourth electronic signal based on a frequency of a second (Continued)

clock signal, and changing based on a second preset frequency interval different from the first preset frequency interval.

20 Claims, 15 Drawing Sheets

(56) References Cited

U.S. PATENT DOCUMENTS

| | | | |
|---|---|---|---|
| 7,912,506 | B2 | 3/2011 | Lovberg et al. |
| 9,559,748 | B2 | 1/2017 | Moradi et al. |
| 10,338,207 | B2 | 7/2019 | Wang et al. |
| 10,461,985 | B2 | 10/2019 | Nadiri et al. |
| 10,502,824 | B2 | 12/2019 | Roger et al. |
| 2014/0219329 | A1 | 8/2014 | Seller et al. |
| 2015/0326236 | A1* | 11/2015 | Thiagarajan ............ H04B 1/40 375/221 |
| 2018/0199377 | A1 | 7/2018 | Sanderovich et al. |
| 2020/0091608 | A1 | 3/2020 | Alpman et al. |

FOREIGN PATENT DOCUMENTS

| | | |
|---|---|---|
| KR | 1999-0035653 A | 5/1999 |
| KR | 10-0668363 | 1/2007 |
| KR | 10-0751065 | 8/2007 |
| KR | 10-0772927 | 11/2007 |
| KR | 10-0947215 B1 | 3/2010 |
| KR | 10-1568138 B1 | 11/2015 |
| KR | 10-2018-0054922 A | 5/2018 |
| KR | 10-2019-0099865 A | 8/2019 |
| KR | 10-2021986 | 9/2019 |
| KR | 10-2180031 B1 | 11/2020 |
| WO | 01/39451 | 5/2001 |

OTHER PUBLICATIONS

PCT Written Opinion dated Dec. 16, 2022 for PCT/KR2022/013259.

Extended European Search Report dated Nov. 22, 2024 for EP Application No. 22881211.1.

Badal Torikul Islam et al: "CMOS Transmitters for 2.4-GHz RF Devices: Design Architectures of the 2.4-GHz CMOS Transmitter for RF Devices", IEEE Microwave Magazine, IEEEService Center, Piscataway, NJ, US, vol. 20, No. 1, Jan. 1, 2019 (Jan. 1, 2019), pp. 38-61, XP011700815.

Zhang Jingjian et al: "A monolithic CMOS IF integrated circuit for a superheterodyne transceiver", 2017 IEEE 17th International Conference on Ubiquitous Wireless Broadband (ICUWB), IEEE, Sep. 12, 2017 (Sep. 12, 2017), pp. 1-5, XP033293886.

Korean Office Action dated Jan. 14, 2026 for KR Application No. 10-2021-0180680.

* cited by examiner

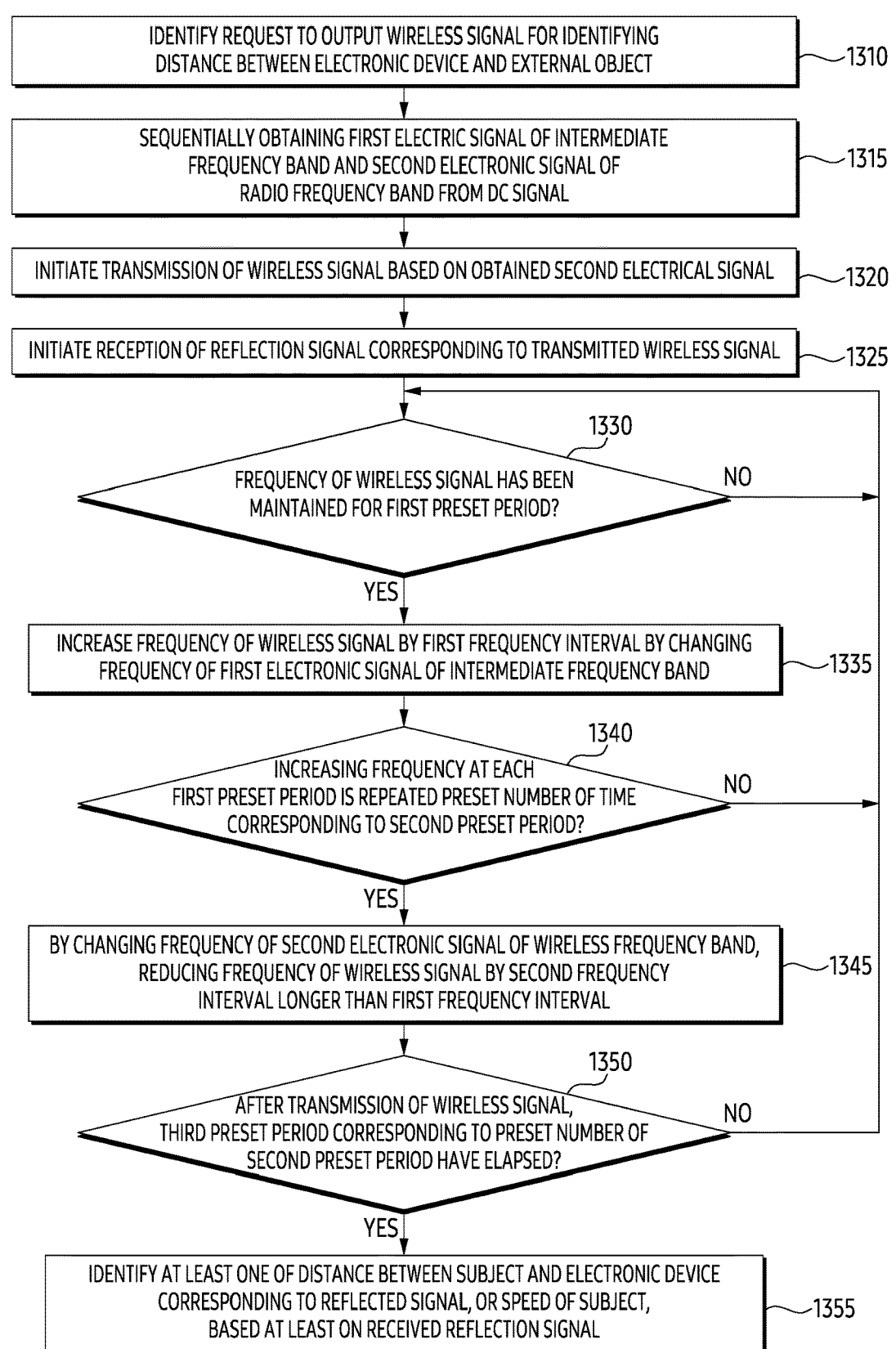

IDENTIFY REQUEST TO OUTPUT WIRELESS SIGNAL FOR IDENTIFYING DISTANCE BETWEEN ELECTRONIC DEVICE AND EXTERNAL OBJECT ~1310

SEQUENTIALLY OBTAINING FIRST ELECTRIC SIGNAL OF INTERMEDIATE FREQUENCY BAND AND SECOND ELECTRONIC SIGNAL OF RADIO FREQUENCY BAND FROM DC SIGNAL ~1315

INITIATE TRANSMISSION OF WIRELESS SIGNAL BASED ON OBTAINED SECOND ELECTRICAL SIGNAL ~1320

INITIATE RECEPTION OF REFLECTION SIGNAL CORRESPONDING TO TRANSMITTED WIRELESS SIGNAL ~1325

1330
FREQUENCY OF WIRELESS SIGNAL HAS BEEN MAINTAINED FOR FIRST PRESET PERIOD?
NO
YES

INCREASE FREQUENCY OF WIRELESS SIGNAL BY FIRST FREQUENCY INTERVAL BY CHANGING FREQUENCY OF FIRST ELECTRONIC SIGNAL OF INTERMEDIATE FREQUENCY BAND ~1335

1340
INCREASING FREQUENCY AT EACH FIRST PRESET PERIOD IS REPEATED PRESET NUMBER OF TIME CORRESPONDING TO SECOND PRESET PERIOD?
NO
YES

BY CHANGING FREQUENCY OF SECOND ELECTRONIC SIGNAL OF WIRELESS FREQUENCY BAND, REDUCING FREQUENCY OF WIRELESS SIGNAL BY SECOND FREQUENCY INTERVAL LONGER THAN FIRST FREQUENCY INTERVAL ~1345

1350
AFTER TRANSMISSION OF WIRELESS SIGNAL, THIRD PRESET PERIOD CORRESPONDING TO PRESET NUMBER OF SECOND PRESET PERIOD HAVE ELAPSED?
NO
YES

IDENTIFY AT LEAST ONE OF DISTANCE BETWEEN SUBJECT AND ELECTRONIC DEVICE CORRESPONDING TO REFLECTED SIGNAL, OR SPEED OF SUBJECT, BASED AT LEAST ON RECEIVED REFLECTION SIGNAL ~1355

FIG. 13

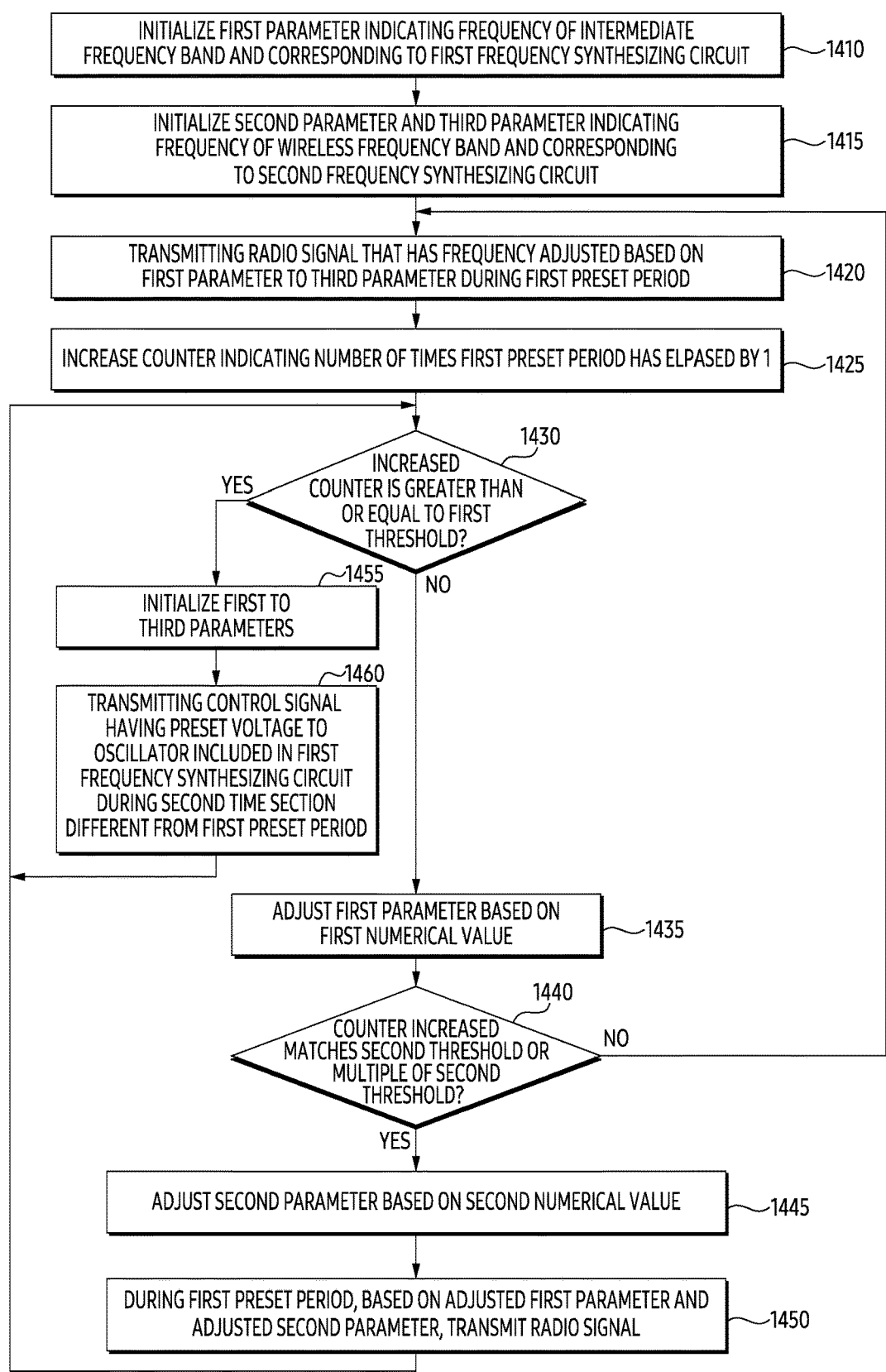

INITIALIZE FIRST PARAMETER INDICATING FREQUENCY OF INTERMEDIATE FREQUENCY BAND AND CORRESPONDING TO FIRST FREQUENCY SYNTHESIZING CIRCUIT ~1410

INITIALIZE SECOND PARAMETER AND THIRD PARAMETER INDICATING FREQUENCY OF WIRELESS FREQUENCY BAND AND CORRESPONDING TO SECOND FREQUENCY SYNTHESIZING CIRCUIT ~1415

TRANSMITTING RADIO SIGNAL THAT HAS FREQUENCY ADJUSTED BASED ON FIRST PARAMETER TO THIRD PARAMETER DURING FIRST PRESET PERIOD ~1420

INCREASE COUNTER INDICATING NUMBER OF TIMES FIRST PRESET PERIOD HAS ELPASED BY 1 ~1425

INCREASED COUNTER IS GREATER THAN OR EQUAL TO FIRST THRESHOLD? 1430

YES

NO

INITIALIZE FIRST TO THIRD PARAMETERS ~1455

TRANSMITTING CONTROL SIGNAL HAVING PRESET VOLTAGE TO OSCILLATOR INCLUDED IN FIRST FREQUENCY SYNTHESIZING CIRCUIT DURING SECOND TIME SECTION DIFFERENT FROM FIRST PRESET PERIOD ~1460

ADJUST FIRST PARAMETER BASED ON FIRST NUMERICAL VALUE ~1435

COUNTER INCREASED MATCHES SECOND THRESHOLD OR MULTIPLE OF SECOND THRESHOLD? 1440

NO

YES

ADJUST SECOND PARAMETER BASED ON SECOND NUMERICAL VALUE ~1445

DURING FIRST PRESET PERIOD, BASED ON ADJUSTED FIRST PARAMETER AND ADJUSTED SECOND PARAMETER, TRANSMIT RADIO SIGNAL ~1450

FIG. 14

ELECTRONIC DEVICE FOR OUTPUTTING WIRELESS SIGNAL BASED ON CHIRP SIGNAL BY MODIFYING FREQUENCY OF FREQUENCY SYNTHESIZING CIRCUIT AND METHOD THEREOF

CROSS-REFERENCE TO RELATED APPLICATIONS

This application is a continuation of International Application No. PCT/KR2022/013259 designating the United States, filed on Sep. 5, 2022, in the Korean Intellectual Property Receiving Office and claiming priority to Korean Patent Application No. 10-2021-0137927, filed on Oct. 15, 2021, and to Korean Patent Application No. 10-2021-0180680, filed on Dec. 16, 2021, each KR application having been filed in the Korean Intellectual Property Office, the disclosures of which are incorporated by reference herein in their entireties.

BACKGROUND

Field

Various example embodiments of the present invention relate to an electronic device and method for outputting a wireless signal based on a chirp signal by modifying a frequency of a frequency synthesizing circuit.

Description of Related Art

According to recent developments in electronic technology and/or wireless communication technology, one or more antennas are included in an electronic device. When the electronic device includes a plurality of antennas, the electronic device may control the plurality of antennas to radiate a wireless signal directed to another electronic device. With the development of electronic technology, application services using wireless signals emitted from electronic devices are diversifying.

Independent of the electronic device including hardware dedicated to the radar function, a method for supporting a radar function may be required.

A method for reducing power consumption of the analog-digital converter (ADC) may be required for an electronic device by executing the radar function independently of the ADC that converts the analog signal from the digital signal of the baseband bandwidth.

A method in which an electronic device executes a radar function using hardware used for wireless data transmission, an electronic device executes a radar function independently of generation of an ADC among hardware used for wireless data transmission may be required.

SUMMARY

According to an example embodiment, the electronic device may generate a wireless signal (e.g., a chip signal having a gradually changing frequency) for executing a radar function using hardware used for wireless data transmission and execute the radar function independently of additionally including a circuit dedicated to the radar function.

The technical problems to be achieved in this document are not limited to those described above, and other technical problems not mentioned herein will be clearly understood by those having ordinary knowledge in the art to which the present disclosure belongs, from the following description.

According to an example embodiment, an electronic device may comprise a first frequency synthesizing circuit configured to output a second electronic signal for converting a frequency of a first electronic signal to a frequency in a first preset frequency bandwidth, based on a first clock signal. The electronic device may comprise a second frequency synthesizing circuit configured to output a fourth electronic signal for converting a frequency of a third electronic signal obtained from the first electronic signal at least based on the second electronic signal to a frequency in a second preset frequency bandwidth different from the first preset frequency bandwidth, based on a second clock signal different from the first clock signal. The electronic device may comprise a communication processor operably coupled to the first frequency synthesizing circuit and the second frequency synthesizing circuit. The communication processor may be configured to transmit to the first frequency synthesizing circuit, a first parameter indicating a frequency of the second electronic signal based on a frequency of the first clock signal, and changing based on a first preset frequency interval according to a first preset period. The communication processor may be configured to transmit, to the second frequency synthesizing circuit, a second parameter indicating a frequency of the fourth electronic signal based on a frequency of the second clock signal, and changing based on a second preset frequency interval different from the first preset frequency interval.

According to an example embodiment, the electronic device may comprise an intermediate frequency circuit for outputting, by converting a frequency of a first electronic signal included in a baseband bandwidth to a frequency in an intermediate frequency bandwidth indicated by a combination of a frequency of the first clock signal and a first multiplier included in a first control signal, a second electronic signal. The electronic device may comprise a radio frequency circuit for outputting, by converting a frequency of the second electronic signal to a frequency included in a radio frequency bandwidth, at least based on a combination of a frequency of the second clock signal and a second multiplier included in a second control signal, a third electronic signal. The electronic device may comprise a communication processor for outputting the first control signal to the intermediate frequency circuit, and for outputting the second control signal to the radio frequency circuit, wherein the communication processor may be configured to: increase, in each of a plurality of first moments separated according to a first preset period, the first multiplier included in the first control signal by a first preset value, and decrease, in each of a plurality of second moments separated according to a second preset period longer than the first preset period, the second multiplier included in the second control signal by a second preset value different from the first preset value.

According to an example embodiment, the method of the electronic device may comprise identifying, based on a first-time interval having a first period, a request to output a wireless signal for identifying a distance between the electronic device and the external object. The method may comprise adjusting, in a state of outputting the wireless signal in response to identifying the request, the frequency of the wireless signal, according to expiration of a plurality of second time intervals included within the first-time interval and distinguished by a second period less than the first period, or expiration of a plurality of third time intervals distinguished by a third period less than the second period.

The method may comprise obtaining, in response to identifying an expiration of the first-time interval after outputting the wireless signal, distance between the electronic device and the external object, based on the reflection signal corresponding to the wireless signal, wherein the operation of adjusting the frequency of the wireless signal may comprise increasing, in response to identifying the expiration of each of the plurality of third time intervals, a frequency of a first electronic signal in an intermediate frequency bandwidth corresponding to the wireless signal, based on the preset frequency interval, and changing, in response to identifying the expiration of each of the plurality of second time intervals, a frequency of the second electronic signal corresponding to the wireless signal and obtained by changing the frequency of the first electronic signal to a frequency of a radio frequency bandwidth, to a preset frequency included in the radio frequency bandwidth.

BRIEF DESCRIPTION OF THE DRAWINGS

FIG. 13 is a flowchart describing an operation of an electronic device according to an example embodiment.

FIG. 14 is a flowchart describing an operation performed by an electronic device using one or more frequency synthesizing circuits according to an example embodiment.

DETAILED DESCRIPTION

Figure 1:
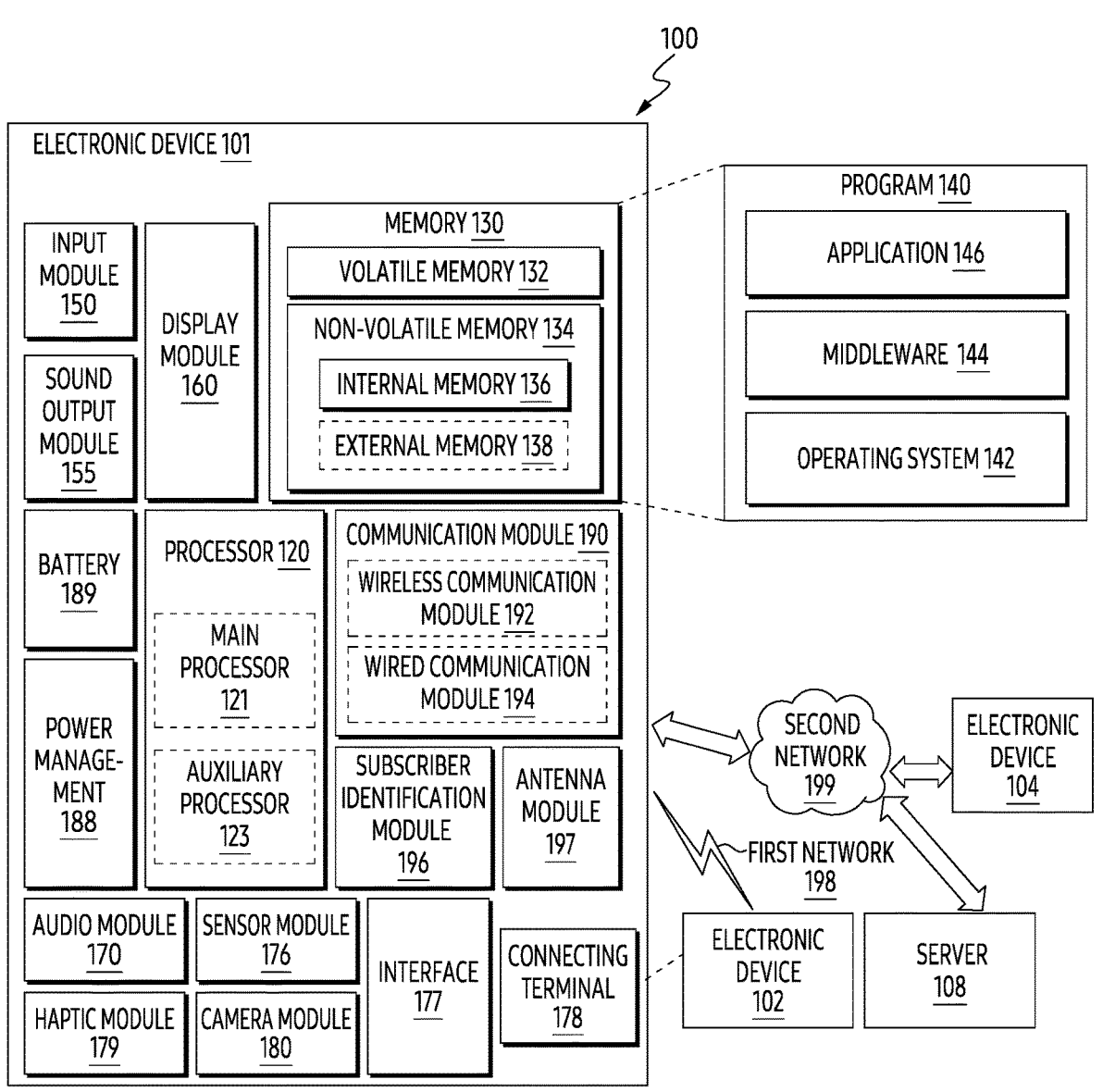
FIG. 1 is a block diagram of an electronic device in a network environment according to various example embodiments.

Hereinafter, various example embodiments will be described with reference to the accompanying drawings.

The electronic device according to an example embodiment can execute a radar function using at least a portion of hardware used for wireless data transmission.

The electronic device according to an example embodiment may execute a radar function independently of an ADC and/or a DAC that performs conversion between an analog signal and a digital signal in a baseband bandwidth.

The various example embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). For example, the use of "second" does not require that a "first" has occurred, and the use of "fourth" for example does not require that first, second, and/or third have occurred or are present. When some (e.g., the first) component is referred to as "coupled" or "connected" in another (e.g., the second) component, with or without the term "functional" or "communicatively", it means that some of the components can be connected directly (e.g., wired), wirelessly, or through at least a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). Each "module" may include circuitry.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121. Each processor described herein may include processing circuitry.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 (e.g., including an antenna) may transmit or receive a signal or power to or from the outside (e.g., the external electronic device) of the electronic device 101. According to an embodiment, the antenna module 197 may include an antenna including a radiating element of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192, including communication circuitry) from the plurality of antennas. The signal or the power may then be transmitted or received between the communication module 190 (including communication circuitry) and the external electronic device via the selected at least one antenna. According to an embodiment, another component (e.g., a radio frequency integrated circuit (RFIC)) other than the radiating element may be additionally formed as part of the antenna module 197.

According to various example embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
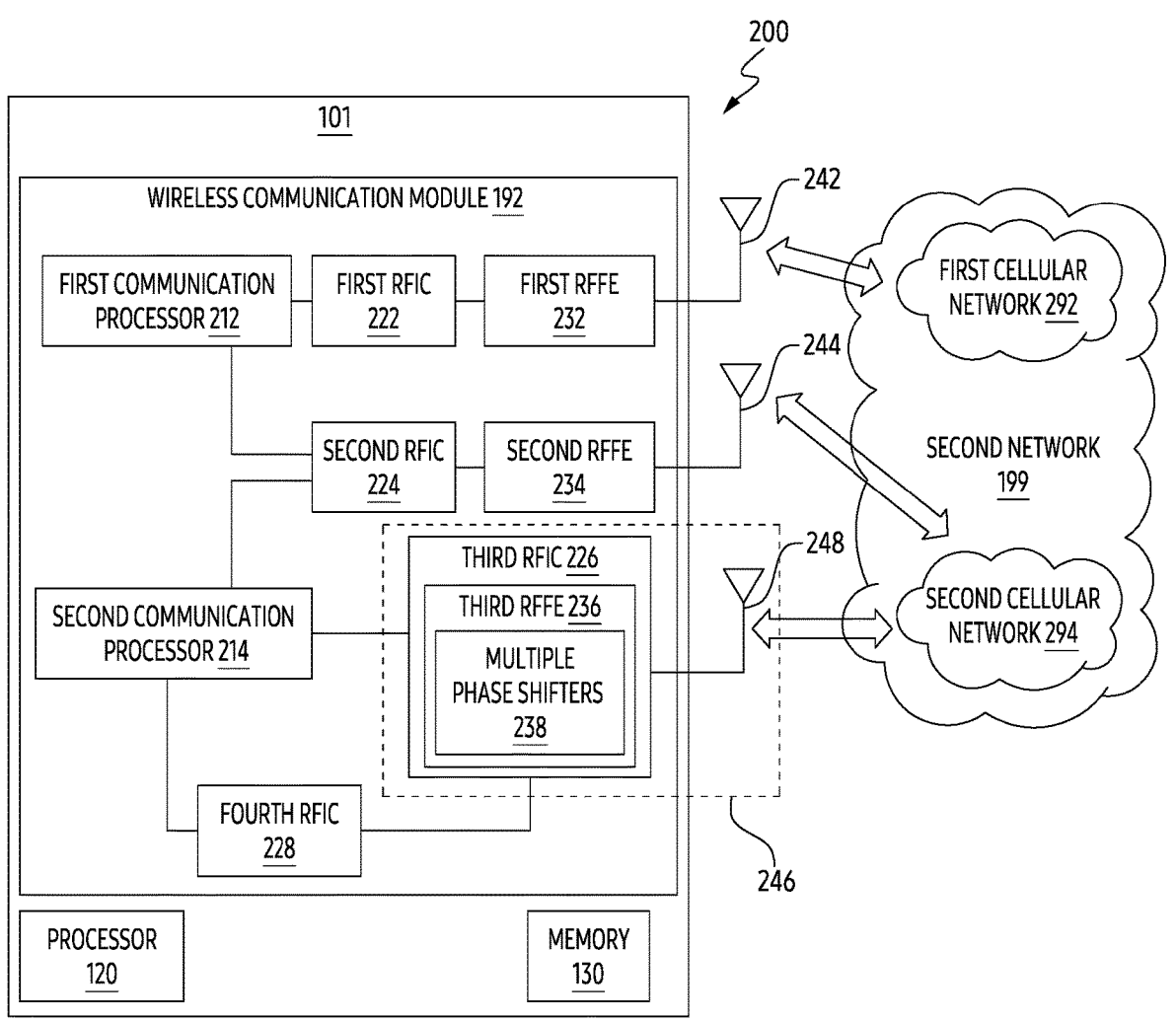
FIG. 2 is a block diagram of an electronic device for supporting legacy network communication and 5G network communication according to various example embodiments.

FIG. 2 is a block diagram 200 of the electronic device 101 for supporting legacy network communication and 5G network communication, according to various example embodiments. Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. Each antenna module may include at least an antenna. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel According to various example embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel According to an embodiment, the first communication processor 212 and the second communication processor 214 may be implemented in a single chip or a single package. According to various embodiments, the first communication processor 212 or the second communication processor 214 may be formed with the processor 120, the coprocessor 123 of FIG. 1, or the communication module 190 in a single chip or a single package. Each communication module herein may include communication circuitry.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE, (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE, 236. For example, the third RFFE, 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE, 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an example embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an example embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246.

According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 130 and may be accessed by other components (e.g., the processor 120, the first communication processor 212, or the second communication processor 214).

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
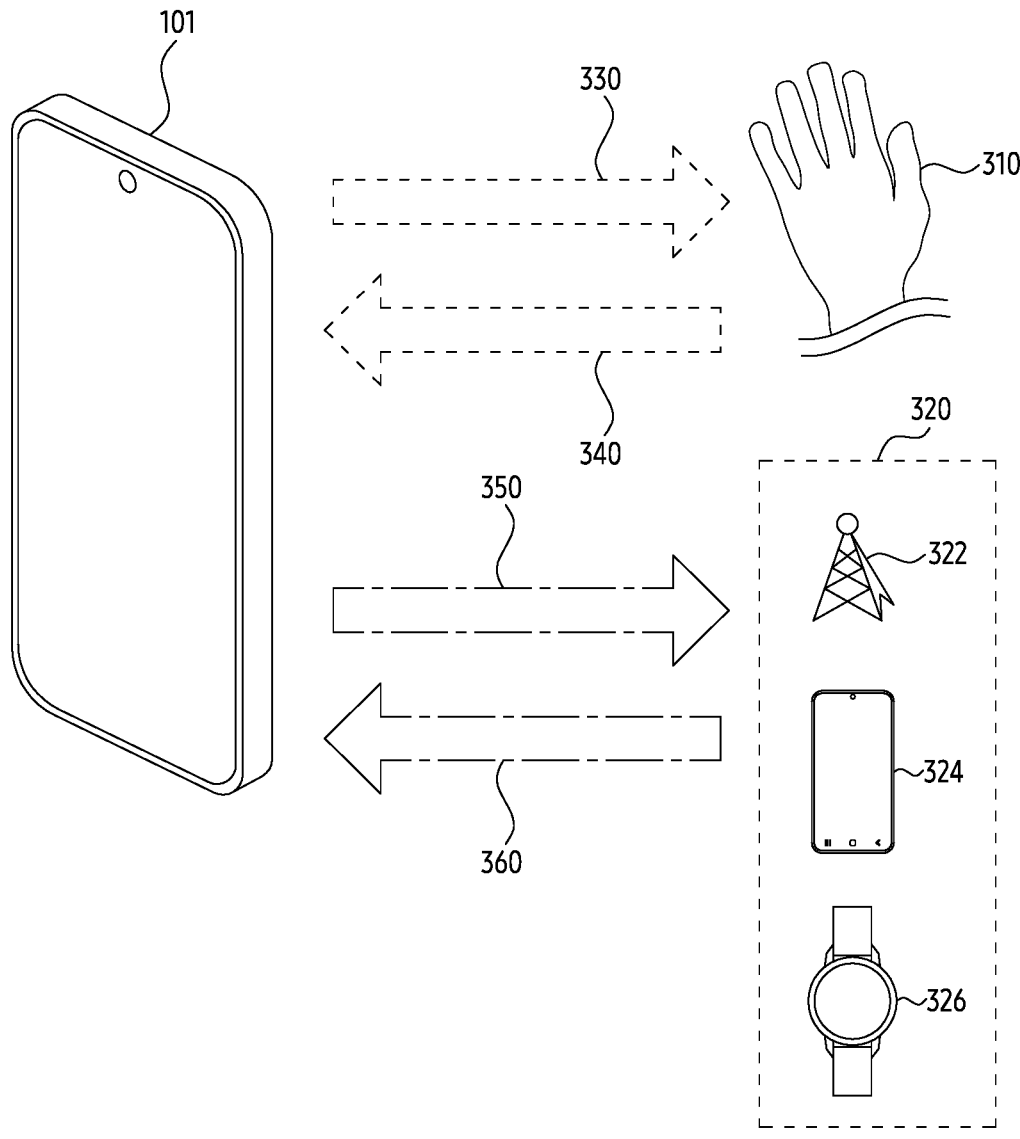
FIG. 3 is an exemplary diagram for describing an operation of transmitting and/or receiving a wireless signal by an electronic device according to an example embodiment.

FIG. 3 is an exemplary diagram for describing an operation of transmitting and/or receiving a wireless signal by the electronic device 101 according to an example embodiment.

The electronic device 101 of FIG. 3 may be an example of the electronic device 101 of FIGS. 1 to 2. The electronic device 101 according to an embodiment may be a terminal owned by a user. The terminal may include, for example, a personal computer (PC) such as a laptop and a desktop, a smartphone, a smart pad, a tablet PC, and smart accessories such as smartwatches and head-mounted devices (HMDs).

The electronic device 101 according to an example embodiment may transmit a wireless signal 350 for communicating with the external electronic device 320 or may receive the wireless signal 360 from the external electronic device 320. Referring to FIG. 3, the external electronic device 320 may include a base station 322, a terminal 324, and/or a smart watch 326. The wireless signals 350 and 360 may include data exchanged between the electronic device 101 and the external electronic device 320, for example, based on a wireless communication protocol for wireless data transmission such as Long Term Evolution (LTE), 5g New Radio (NR), Wireless Fidelity (WiFi), Zigbee, Near Field Communication (NFC), Bluetooth, or Bluetooth Low-Energy (BLE). For example, the wireless signal 350 may be transmitted to another electronic device (e.g., an external electronic device 320) to transmit and/or receive data (e.g., request a wireless signal 360 including data). For example, the external electronic device 320 may transmit a wireless signal 360 including data in response to receiving the wireless signal 350. The electronic device 101 according to an embodiment may transmit a wireless signal 350 or receive a wireless signal 360 using, for example, the wireless communication module 192 of FIGS. 1 to 2.

The electronic device 101 according to an example embodiment may transmit a wireless signal 330 for detecting an external object (referring to FIG. 3, a user's hand 310). Referring to FIG. 3, the wireless signal 330 transmitted by the electronic device 101 may be reflected from an external object such as a hand 310. The electronic device 101 according to an embodiment may receive a wireless signal 340 reflected from an external object such as a hand 310. The wireless signal 340 received by the electronic device 101 may have a phase and/or delay different from that of the wireless signal 330 according to a distance between the electronic device 101 and an external object. The wireless signal 340 received by the electronic device 101 may have a frequency changed according to a speed of an external object, for example, such as a Doppler effect. The electronic device 101 according to an embodiment may obtain at least one of a distance between the electronic device 101 and the external object and/or a speed of the external object in response to receiving the wireless signal 340.

The electronic device 101 according to an embodiment may execute one or more functions related to the user based on a distance between the external object and the electronic device obtained using the wireless signals 330 and 340 and/or a speed of the external object. The electronic device 101 according to an embodiment may identify a non-contact gesture different from a touch gesture requiring a user's contact, such as a touch screen, using wireless signals 330 and 340. For example, the non-contact gesture may include a movement of an external object such as a hand 310 existent in a space in which the wireless signal 330 is propagated. In response to identifying the non-contact gesture, electronic device 101 may execute one or more functions matching the non-contact gesture.

Identifying an external object by the electronic device 101 according to an embodiment using the wireless signals 330 and 340 may be related to a Frequency Modulated Continuous Wave (FMCW) radar. Hereinafter, the wireless signal 330 may be referred to as a radar signal, and the wireless signal 340 may be referred to as a reflection signal for the radar signal. The electronic device 101 according to an embodiment may transmit the wireless signal 330 or receive the wireless signal 340 using a hardware component (e.g., the wireless communication module 192 of FIGS. 1 to 2) supporting transmission and/or reception of the wireless signals 350 and 360. One or more hardware components included in the electronic device 101 according to an embodiment and for performing all of the FMCW radar function and the wireless data transmission function will be described later in FIGS. 4 to 5, 7 and/or 12.

A waveform of the wireless signal 330 transmitted by the electronic device 101 according to an embodiment may have a waveform based on an FMCW radar function. For example, the frequency of the wireless signal 330 may change repeatedly and gradually along a preset period, such as a chirp signal. The wireless signal 340 corresponding to the reflection signal of the wireless signal 330 may have a waveform similar to that of the wireless signal 330 and may have a different phase from that of the wireless signal 330. The waveforms of the radio signals 330 and 340 will be described later based on a time domain and/or a frequency domain in FIGS. 6A to 6B, 8, 10 to 11.

According to an example embodiment, in a state in which the FMCW radar function is executed based on a hardware component (e.g., the wireless communication module 192 of FIGS. 1 to 2) for wireless data transmission, the electronic device 101 may generate a wireless signal 330 based on the chirp signal. According to an embodiment, the electronic device 101 may support transmission of wireless signals 330 and 350 based on a frequency bandwidth referred to as the mm Wave or reception of wireless signals 340 and 360. For example, the wireless signal 350 transmitted by the electronic device 101 may have a frequency included in a frequency bandwidth of about 24 GHz to about 40 GHz. For example, the frequency of the wireless signal 330 transmitted by the electronic device 101 may change based on the waveform of the chirp signal within the frequency bandwidth of about 24 GHz to about 24.25 GHz.

As described above, since the electronic device 101 according to an embodiment executes an FMCW radar function based on a hardware component for wireless data transmission, the electronic device 101 may execute the FMCW radar function independently of whether a dedicated hardware component is included to support the FMCW radar function. While the FMCW radar function is being executed based on hardware components for wireless data transmission, the electronic device 101 may identify at least one of a distance between the electronic device 101 and an external object or a speed of the external object based on the frequency, phase, and/or delay of at least one of the wireless signals 330 and 340. For example, even if the wireless signals 330 and 340 do not include data, the electronic device 101 may identify the frequency, phase, and/or delay of at least one of the wireless signals 330 and 340. In this case, while the FMCW radar function is executed, the electronic device 101 may deactivate a part of hardware (e.g., an analog-to-digital converter (ADC) and/or a digital-to-analog converter (DAC)) that generates an analog signal based on digital data for wireless data transmission.

Hereinafter, referring to FIG. 4, one or more hardware components included in the electronic device 101 according to an example embodiment will be described.

Figure 4:
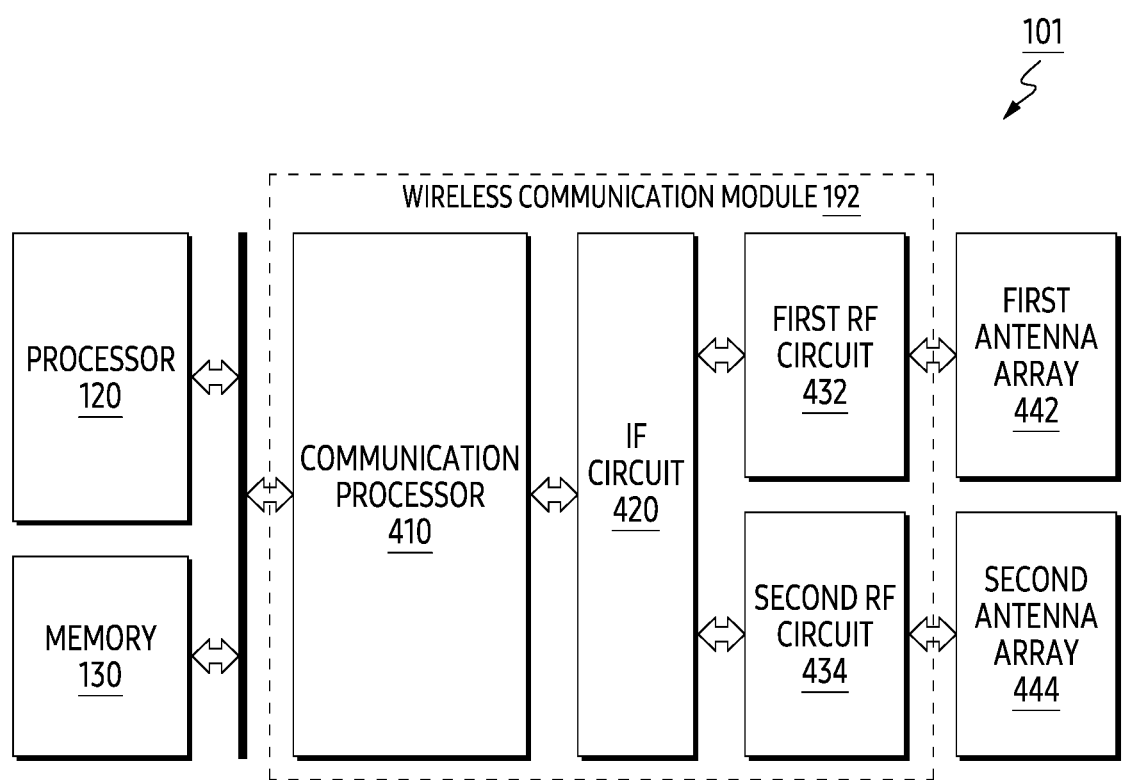
FIG. 4 is an exemplary block diagram of an electronic device according to an example embodiment.

FIG. 4 is an exemplary block diagram of an electronic device 101 according to an example embodiment.

The electronic device 101 of FIG. 4 may be an example of the electronic device 101 of FIGS. 1 to 3. Referring to FIG. 4, the electronic device 101 according to an embodiment may comprise at least one of a processor 120, a memory 130, and a wireless communication module 192. The processor 120, the memory 130, and the wireless communication module 192 may be electrically and/or operatively coupled with each other by an electronic component such as a communication bus. The type and/or number of hardware components included in the electronic device 101 are not limited to those illustrated in FIG. 4. For example, the electronic device 101 may comprise only some of the hardware components illustrated in FIG. 4.

The processor 120 of the electronic device 101 according to an embodiment may include hardware components for processing data based on one or more instructions. For example, hardware components for processing data may include an arithmetical and logic unit (ALU), a field programmable gate array (FPGA), and/or a central processing unit (CPU). The number of processors 120 may be one or more. For example, the processor 120 may have a structure of a multi-core processor such as a dual core, a quad core, or a hexa core. The processor 120 of FIG. 4 may correspond to the processor 120 of FIGS. 1 to 2.

The memory 130 of the electronic device 101 according to an embodiment may include hardware components for storing data and/or instructions input and/or output to the processor 120. The memory 130 may include, for example, a volatile memory such as random-access memory (RAM) and/or a non-volatile memory such as Read-only memory (ROM). Volatile memory may include, for example, at least one of Dynamic RAM (DRAM), Static RAM (SRAM), Cache RAM, and Pseudo SRAM (PSRAM). The nonvolatile memory may include, for example, at least one of a Programmable ROM (PROM), an Erasable PROM (EPROM), an Electrically erasable PROM (EEPROM), a flash memory, a hard disk, a compact disk, and an Embedded multi-media card (EMMC). The memory 130 of FIG. 4 may correspond to the memory 130 of FIGS. 1 to 2.

Referring to FIG. 4, the wireless communication module 192 of the electronic device 101 according to an embodiment may include at least one of a communication processor 410, an IF circuit 420, a first radio frequency (RF) circuit 432, a second RF circuit 434, a first antenna array 442, and a second antenna array 444. The electronic device 101 according to an embodiment may selectively execute at least one of a wireless data transmission function and an FMCW radar function by using the wireless communication module 192.

The communication processor 410 in the wireless communication module 192 of the electronic device 101 according to an embodiment may control other hardware components included in the wireless communication module 192 to transmit and/or receive wireless signals between an external electronic device (e.g., the external electronic device 320 of FIG. 3) different from the electronic device 101. For example, in response to receiving a request to transmit data from the processor 120 to an external electronic device, the communication processor 410 may output an electronic signal (e.g., a digital data signal) having a frequency bandwidth of base band based on the data to the IF circuit 420. Hereinafter, the base band may be a frequency band used by the communication processor 410 for transmitting and receiving electronic signals, and may mean, for example, a frequency band including 0 GHz.

In an example embodiment, the communication processor 410 may control other hardware components included in the wireless communication module 192 to identify a positional relationship between the electronic device 101 and an external object (e.g., hand 310 of FIG. 3) distinguished from the electronic device 101. For example, in response to receiving a request from the processor 120 to identify an external object distinguished from the electronic device 101 based on a radar signal, the communication processor 410 may control other hardware components included in the wireless communication module 192 to generate a radar signal.

The IF circuit 420 of the electronic device 101 according to an embodiment may perform frequency conversion between an electronic signal having a frequency of a base band and an electronic signal having a frequency of an intermediate frequency band. Hereinafter, the intermediate frequency band may mean a frequency band including, for example, about 8 GHz as a frequency band of electronic signals between the IF circuit 420 and the RF circuit (e.g., the first RF circuit 432 and/or the second RF circuit 434 of FIG. 4). In an embodiment, the IF circuit 420 of the electronic device 101 may perform conversion between a digital electronic signal based on a base band and an analog electronic signal based on an intermediate frequency band.

The RF circuit (e.g., the first RF circuit 432 and/or the second RF circuit 434 of FIG. 4) of the electronic device 101 according to an embodiment may perform frequency conversion between an electronic signal having a frequency of an intermediate frequency band and an electronic signal having a frequency of a radio frequency band. Hereinafter, the radio frequency band may be a frequency band of a wireless signal transmitted or received by an antenna (e.g., the first antenna array 442 and/or the second antenna array 444 of FIG. 4), and for example, may be at least a part of a frequency band of about 24 GHz to about 40 GHz. In an embodiment, the RF circuit of the electronic device 101 may perform impedance matching related to an antenna connected to the RF circuit (For example, the first RF circuit 432 of FIG. 4 is connected to the first antenna array 442, and the second RF circuit 434 is connected to the second antenna array 444).

The antenna (e.g., the first antenna array 442 and/or the second antenna array 444 of FIG. 4) of the electronic device 101 according to an embodiment may transmit a wireless signal (e.g., at least one of the wireless signals 330 and 350 of FIG. 3) based on the electronic signal received from the RF circuit. The antenna of the electronic device 101 according to an embodiment may output an electronic signal corresponding to the wireless signal received to the RF circuit in response to receiving a wireless signal (e.g., at least one of the wireless signals 340 and 360 of FIG. 3). The antenna of the electronic device 101 may be disposed adjacent to the side surface (e.g., at least one surface between the front surface of the electronic device 101 on which the display is disposed and the rear surface opposite to the front surface) of the housing of the electronic device 101. As the antenna is disposed adjacent to the side surface of the housing of the electronic device 101, the antenna may be separated from the main board (or logic board) on which other hardware components distinguished from the antenna are disposed in the processor 120, the memory 130, and the wireless communication module 192.

Referring to FIG. 4, in a state in which the processor 120 requests transmission of data to the communication processor 410, as sequentially transmitted to the IF circuit 420 and the first RF circuit 432 connected to the IF circuit 420, the frequency of the electronic signal output from the communication processor 410 and based on the data may be increased from the frequency of the base band to the frequency of the radio frequency band (e.g., a frequency band of about 24 GHz to about 40 GHz). In the first antenna array 442, a wireless signal corresponding to the electric signal increased to a frequency of the radio frequency band may be transmitted. For example, a signal path from the processor 120 to the communication processor 410, the IF circuit 420, the first RF circuit 432, and the first antenna array 442 may be used for transmitting a wireless signal by the electronic device 101.

Referring to FIG. 4, when an electronic signal corresponding to a wireless signal transmitted from an external electronic device is output from the second antenna array 444, as the second RF circuit 434 and the second RF circuit 434 are sequentially transmitted to the IF circuit 420 connected thereto, the frequency of the electronic signal output from the second antenna array 444 may be decreased from the frequency of the radio frequency band to the frequency of the base band. In response to receiving the electronic signal decreased to the frequency of the baseband from the IF circuit 420, the communication processor 410 may notify the processor 120 of receiving the electronic signal. For example, a signal path from the second antenna array 444 to the second RF circuit 434, the IF circuit 420, the communication processor 410, and the processor 120 may be used to receive a wireless signal by the electronic device 101.

As described above, the electronic device 101 according to an embodiment may execute an FMCW radar function using the wireless communication module 192 for wireless data transmission. In order to generate a radar signal (e.g., a chirp signal) related to the FMCW radar function, the wireless communication module 192 may include one or more frequency synthesizing circuits for generating the radar signal. The communication processor 410 of the electronic device 101 according to an embodiment may control one or more frequency synthesizing circuits included in the wireless communication module 192 to output a wireless signal having a frequency that gradually changes within a preset frequency band along a preset period.

In an embodiment, the IF circuit 420 may include one or more frequency synthesizing circuits for conversion between the frequency of the base band and the frequency of the intermediate frequency band. For example, the frequency synthesizing circuit included in the IF circuit 420 may increase the frequency of the electronic signal received from the communication processor 410 to the frequency of the intermediate frequency band based on the clock signal. The communication processor 410 according to an embodiment may transmit a first control signal including a parameter indicating a frequency of the intermediate frequency band to the frequency synthesizing circuit included in the IF circuit 420 based on a multiple of the clock signal (e.g., a rational number to be applied to the clock signal). The parameter included in the first control signal may be adjusted by the communication processor 410, in at least a portion of the intermediate frequency band, to gradually increase the frequency of the electronic signal of the intermediate frequency band transmitted from the IF circuit 420 to the first RF circuit 432.

In an embodiment, each of the first RF circuit 432 and the second RF circuit 434 may include a frequency synthesizing circuit for conversion between a frequency of an intermediate frequency band and a radio frequency band. For example, the frequency synthesizing circuit included in the first RF circuit 432 may increase the frequency of the electronic signal received from the IF circuit 420 to the frequency of the radio frequency band based on the clock signal. The communication processor 410 according to an embodiment may transmit a second control signal including a parameter indicating a frequency of the radio frequency band, based on a multiple of the clock signal (e.g., a fraction applied to the clock signal and indicated by at least two integers), to the frequency synthesizing circuit included in the first RF circuit 432. The parameter included in the second control signal may be adjusted by the communication processor 410 so that the frequency of the electronic signal of the radio frequency band transmitted from the first RF circuit 432 to the first antenna array 442 becomes a preset frequency every preset period.

As the communication processor 410 according to an embodiment adjusts the frequency of the electronic signal transmitted to the first antenna array 442 based on the first control signal and the second control signal, a wireless signal corresponding to the chirp signal may be transmitted from the first antenna array 442. The wireless signal corresponding to the chirp signal may include, for example, wireless signal 330 of FIG. 3. The wireless signal transmitted from the first antenna array 442 may be reflected toward the second antenna array 444 by an external object (e.g., hand 310 of FIG. 3). For example, the second antenna array 444 may receive the reflection signal (e.g., the wireless signal 340 of FIG. 3) of the wireless signal. In response to receiving the reflection signal, an electronic signal corresponding to the reflection signal may be transmitted from the second antenna array 444 to the second RF circuit 434.

For example, the frequency synthesizing circuit included in the second RF circuit 434 may modify the frequency of the electronic signal received from the second antenna array 444 to the frequency of the intermediate frequency band based on the clock signal. The communication processor 410 according to an embodiment may transmit the second control signal transmitted to the first RF circuit 432 to the second RF circuit 434. The second control signal may be used to generate an electronic signal to be transmitted to the IF circuit 420 with a frequency of an intermediate frequency band from the electronic signal received from the second antenna array 444 by the frequency synthesizing circuit included in the second RF circuit 434.

In an embodiment, the IF circuit 420 may change the frequency of the electronic signal based on the intermediate frequency band received from the second RF circuit 434 to the frequency of the base band by using a frequency synthesizing circuit for changing a frequency of an electronic signal received from the processor 410 to a frequency of an intermediate frequency band. The first control signal transmitted to the frequency synthesizing circuit by the communication processor 410 according to an embodiment may be used to generate an electronic signal to be transmitted to the communication processor 410 with a frequency of a base band from the electronic signal received from the second RF circuit 434 by the frequency synthesizing circuit included in the IF circuit 420.

The communication processor 410 according to an embodiment may identify reception of a wireless signal in the second antenna array 444 in response to receiving the electronic signal having a frequency of a baseband from the IF circuit 420. The communication processor 410 may obtain information indicating a distance between the electronic device 101 and the external object or a speed of the external object from the electronic signal received from the IF circuit 420. For example, the communication processor 410 may obtain the information by performing Fast Fourier Transform (FFT) on the electronic signal. In response to obtaining the information, the communication processor 410 may transmit the obtained information to the processor 120. For example, the frequency of the electronic signal identified based on the Fast Fourier Transform (FFT) may be related to a distance between the electronic device 101 and an external object.

As described above, the electronic device 101 according to an embodiment may execute all of the wireless data transmission function and the FMCW radar function using the wireless communication module 192. The communication processor 410 of the electronic device 101 may transmit a control signal related to transmission or reception of a radio signal based on the chirp signal to the IF circuit 420 and the frequency synthesizing circuit connected to each of one or more RF circuits (e.g., the first RF circuit 432 and the second RF circuit 434) based on the multiple of the clock signal.

Hereinafter, referring to FIG. 5, A signal path (e.g., a signal path leading to the communication processor 410, the IF circuit 420, the first RF circuit 432, and the first antenna array 442) of the wireless communication module 192 used for transmitting a radar signal will be described in detail.

Figure 5:
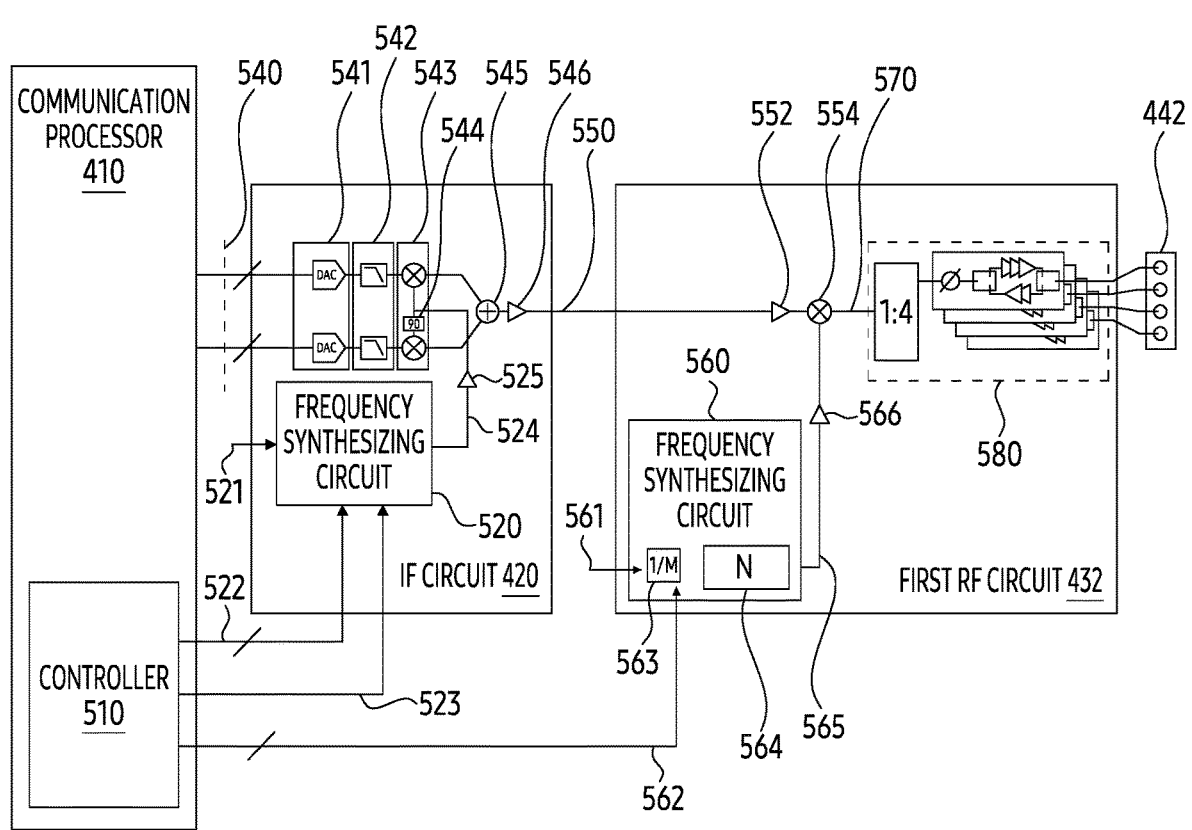
FIG. 5 is an exemplary diagram for describing an operation of transmitting a wireless signal by an electronic device according to an example embodiment.

FIG. 5 is an exemplary diagram for describing an operation of transmitting a wireless signal by the electronic device 101 according to an example embodiment. The electronic device 101 of FIG. 5 may be an example of the electronic device 101 of FIGS. 1 to 4. For example, FIG. 5 is a diagram illustrating a portion of the electronic device 101 of FIG. 4 and may correspond to a portion of the electronic device 101 related to transmission of a radar signal.

Referring to FIG. 5, according to an embodiment, the communication processor 410 of the electronic device 101 is one or more frequency synthesizing circuits connected to the IF circuit 420 and one or more RF circuits (e.g., the first RF circuit 432 of FIGS. 4 to 6 and/or the second RF circuit 434 of FIGS. 4 to 5) and may include a controller 510 for providing a control signal. Each controller herein may include controlling and/or processing circuitry.

Referring to FIG. 5, the electronic device 101 according to an embodiment may include a frequency synthesizing circuit 520 that adjusts a frequency of an intermediate frequency band to be generated by the IF circuit 420 to generate a radar signal. In an embodiment, the frequency synthesizing circuit 520 may be included in the IF circuit 420. The frequency synthesizing circuit 520 may generate a reference signal 524 indicating a frequency of an electronic signal to be generated from the IF circuit 420 based on the control signals 522 and 523 provided from the controller 510 and the clock signal 521.

The control signal 522 output by the controller 510 according to an embodiment to the frequency synthesizing circuit 520 may include a parameter indicating a multiple to be applied to a frequency (e.g., 52 MHz) of the clock signal 521 input to the frequency synthesizing circuit 520. The parameter may include a plurality of bits representing the multiple according to a floating point. The frequency f_ref1 of the reference signal 524 transmitted by the frequency synthesizing circuit 520 may be a frequency obtained by multiplying the frequency f_clk1 of the clock signal 521 by the multiple a (f_ref1=ref_clk1×a). The frequency of the reference signal 524 may be included in the intermediate frequency band. A change in the multiple represented by the parameter of the control signal 522 will be described later with reference to FIGS. 6A to 6B.

Referring to FIG. 5, the reference signal 524 output from the frequency synthesizing circuit 520 may be coupled to the electronic signal 540 transmitted from the communication processor 410 to the IF circuit 420 within the IF circuit 420. The electronic signal 540 may be filtered by a Low-Pass Filter (LPF) 542 after being analog-to-digital converted by the DAC 541. The electronic signal 540 converted by the DAC 541 may include two signals (e.g., an in-phase (I) signal based on a real axis and a quadrate (Q) signal based on an imaginary axis) based on different axes of the complex plane. In an embodiment, the electronic signal 540 may be a direct current (DC) signal having a frequency substantially corresponding to 0. As the DC signal is input to the IF circuit 420 as the electronic signal 540, the IF circuit 420 may not activate the DAC 541 or may output an electronic signal 550 in an intermediate frequency band while operating the DAC 541 based on a relatively low frequency.

Referring to FIG. 5, the electronic signal 540 filtered by the LPF 542 may be coupled to the reference signal 524 by a frequency mixer 543. Referring to FIG. 5, before being transmitted to the frequency mixer 543, the reference signal 524 may be amplified by the amplifier 525. The frequency mixer 543 may include a phase shifter 544 for coupling (e.g., Quadrature Mixing) the reference signal 524 based on a phase of each of the I signal and the Q signal included in the electronic signal 540. For example, a frequency of each of the I signal and the Q signal of the electronic signal 540 included in the baseband may be changed to a frequency (e.g., frequencies based on clock signals 521 and control signals 522 and 523) of the reference signal 524 as coupled to reference signal 524 by frequency mixer 543. The IF circuit 420 may have a frequency (e.g., a frequency included in an intermediate frequency band) of the reference signal 524 and output an electronic signal 550 to which the I signal and the Q signal are coupled by the combiner 545. Referring to FIG. 5, the IF circuit 420 may include an amplifier 546 for changing the magnitude of the electronic signal 550.

Referring to FIG. 5, the electronic device 101 according to an embodiment may include a frequency synthesizing circuit 560 that adjusts a frequency of a radio frequency band to be generated by the first RF circuit 432 to generate a radar signal. In an embodiment, the frequency synthesizing circuit 560 may be included in the first RF circuit 432. The frequency synthesizing circuit 560 may generate a reference signal 565 indicating a frequency of an electronic signal to be generated from the first RF circuit 432 based on the control signal 562 provided from the clock signal 561 or the controller 510. The frequency of the clock signal 561 may be different from the frequency of the clock signal 521 (e.g., a frequency of 500 MHz), or may be a frequency obtained by multiplying the frequency of the clock signal 521 by a preset multiple.

According to an example embodiment, the control signal 562 output by the controller 510 to the frequency synthesizing circuit 560 may include a parameter indicating a multiple to be applied to the frequency of the clock signal 561 input to the frequency synthesizing circuit 560. Referring to FIG. 5, The frequency synthesizing circuit 560 may include a frequency divider 563 that outputs an electronic signal having a frequency f_clk2/M obtained by dividing a frequency f_clk2 of the clock signal 561 along a first numerical value M indicated by a parameter included in the control signal 562. The frequency synthesizing circuit 560 may include a frequency multiplier 564 in which the frequency f_clk2/M of the electronic signal of the frequency splitter 563 is indicated by a parameter included in the control signal 562 and outputting an electronic signal having a frequency f_clk2×N/M multiplied by a second numerical value N distinguished from the first numerical value M. For example, the control signal 562 may include a plurality of bits representing a pair of the first numerical value M and the second numerical value N. The electronic signal output from the frequency multiplier 564 may correspond to a reference signal 565 output from the frequency synthesizing circuit 560.

Referring to FIG. 5, the reference signal 565 output from the frequency synthesizing circuit 560 may be coupled to the electronic signal 550 transmitted from the IF circuit 420 by the frequency mixer 554 included in the first RF circuit 432. The first RF circuit 432 may include an amplifier 552 for amplifying an electronic signal 550 transmitted toward the frequency mixer 554, and an amplifier 566 for amplifying a reference signal 565 transmitted toward the frequency mixer 554. As the frequency of the electronic signal 550 increases by the frequency of the reference signal 565 by the frequency mixer 554, the frequency of the electronic signal 570 output from the frequency mixer 554 may correspond to the combination of the frequency of the reference signal 524 and the frequency of the reference signal 565. For example, the frequency of the electronic signal 570 may be included in the radio frequency band.

Referring to FIG. 5, the first RF circuit 432 may include a phased-array 580 for forming a radiation pattern based on the first antenna array 442. The electronic signal 570 may be transmitted to the first antenna array 442 through the phased array 580. In the phased array 580, impedance matching between the first antenna array 442 and the first RF circuit 432 and/or amplification of a wireless signal to be transmitted from the first antenna array 442 may be further performed.

As described above, according to an example embodiment, controller 510 of the electronic device 101 may change the frequency of the wireless signal transmitted from the first antenna array 442 by transmitting the control signals 522, 523, and 562 to the frequency synthesizing circuits 520 and 560. For example, as the frequency of the wireless signal is changed by the control signals 522, 523, and 562, the waveform of the wireless signal may correspond to the waveform of the chirp signal. Within the first-time section for transmitting the radio signal based on the chirp signal, the control signal 523 may be repeatedly changed according to the first-time section to notify the expiration of the first-time interval. Within the first-time section, the control signals 522 and 562 may be repeatedly changed along a period less than the length of the first-time section. For example, in order to gradually increase or decrease the frequency of the wireless signal, the control signal 522 may adjust the frequency of the electronic signal 550 based on a first period less than the first-time section. For example, the control signal 562 may change the frequency of the electronic signal 570 to the preset frequency every second period in order to change the frequency of the wireless signal to a preset frequency based on a second period longer than the first period within the first time section. In this case, within the first time section, the frequency of the wireless signal transmitted from the first antenna array 442 may gradually change from the preset frequency to another frequency at each second period.

As described above, according to an example embodiment, as the electronic device 101 generates a radio signal, which is a chirp signal, from the electronic signal 540 in the baseband, which is a DC signal, the DAC 541 included in the electronic device 101 may operate based on a relatively small frequency. For example, the electronic device 101 may generate a radar signal independently of a digital signal (e.g., an electronic signal 540) of a baseband. As the DAC 541 operates based on a relatively small frequency, power consumption of the DAC 541 may decrease. For example, based on relatively little power consumption, the electronic device 101 may generate a radar signal.

Hereinafter, referring to FIGS. 6A to 6B, electronic signals 540, 550, and 570 transmitted in the electronic device 101 while the electronic device 101 according to an embodiment generates a radar signal, reference signals 524 and 565 and control signals 522 and 562 will be described in detail.

Figure 6A:
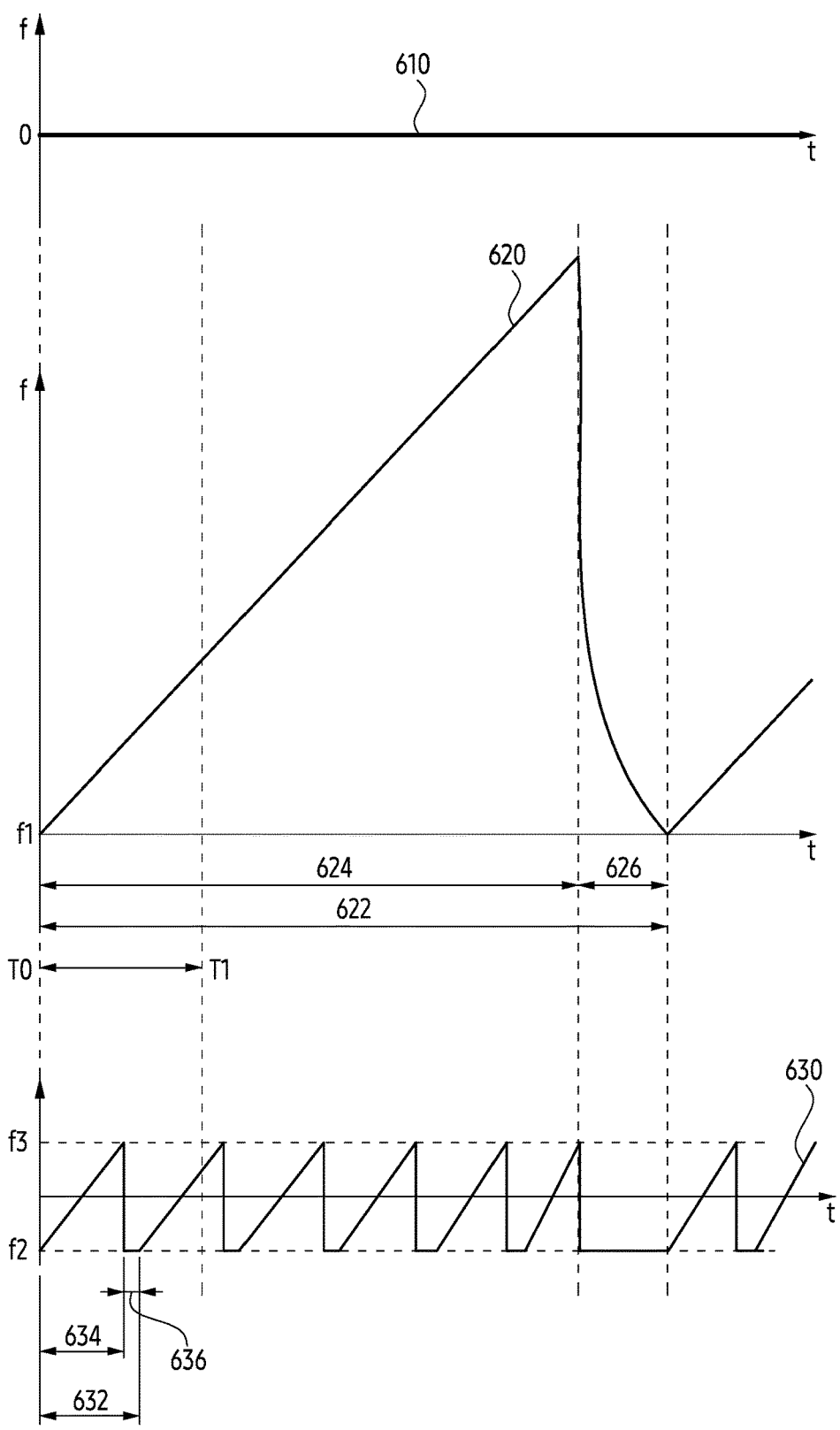
FIGS. 6A to 6B are graphs for describing an electronic signal transmitted in an electronic device while the electronic device transmits a wireless signal according to an example embodiment.
Figure 6B:
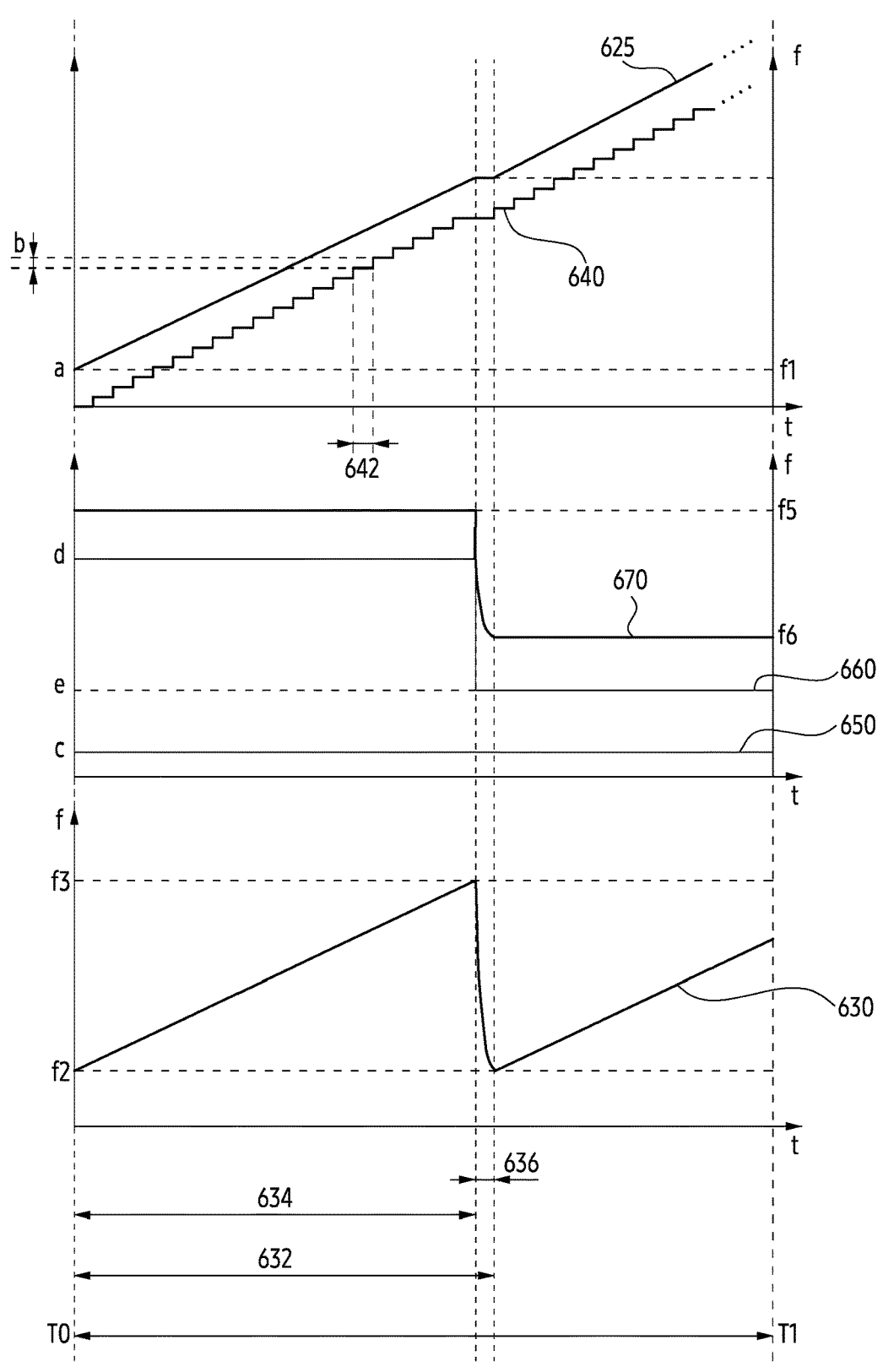

FIGS. 6A to 6B are graphs 610, 620, and 630 for explaining an electronic signal transmitted in the electronic device while the electronic device according to an example embodiment transmits a wireless signal. The electronic device of FIGS. 6A to 6B may be an example of the electronic device 101 of FIGS. 1 to 5.

A graph 610 of FIG. 6A illustrates a first electronic signal of a baseband transmitted from a communication processor in an electronic device to an IF circuit within a frequency domain. The first electronic signal may include, for example, an electronic signal 540 transmitted from the communication processor 410 of FIG. 5 to the IF circuit 420. In a state of transmitting a radar signal, according to an embodiment, the communication processor of the electronic device may transmit a first electronic signal, which is a DC signal having a voltage of a preset magnitude and a frequency substantially corresponding to 0, to the IF circuit.

The graph 620 of FIG. 6A illustrates the second electronic signal of the intermediate frequency band transmitted from the IF circuit to the RF circuit in the electronic device on the frequency band. The second electronic signal may include, for example, an electronic signal 550 transmitted from the IF circuit 420 of FIG. 5 to the first RF circuit 432. The electronic device according to an embodiment may transmit one or more control signals for generating the second electronic signal by adjusting a frequency of the first electronic signal to a frequency synthesizing circuit corresponding to the IF circuit. Referring to the graph 620, the frequency of the second electronic signal may be repeatedly changed along a period (e.g., a frame) having a length of a time section 622 by the one or more control signals.

For example, within the first time section 624 included in the time section 622, the frequency of the second electronic signal may gradually increase from the frequency f1. Within the second time section 626 included in the time section 622 and distinguished from the first time section 624, the frequency of the second electronic signal may decrease toward the frequency f1. In this case, the frequency of the second electronic signal may substantially coincide with the frequency f1 at each of the beginning and end moment of the time section 622. The frequency of the second electronic signal including the frequency f1 may be included in the intermediate frequency band. For example, the second electronic signal may gradually increase from 8 GHz to 8.25 GHz within the first time section 624, and then decrease from 8.25 GHz to 8 GHz within the second time section 626.

According to an embodiment, the electronic device may transmit control signals to a frequency synthesizing circuit included in the IF circuit in order to generate a second electronic signal having a frequency that changes as shown in the graph 620 from the first electronic signal. For example, the controller 510 of FIG. 5 may transmit control signals 522 and 523 for adjusting the frequency of the electronic signal 540 to the frequency synthesizing circuit 520 included in the IF circuit 420. The control signal 522 of FIG. 5 may include a first control signal for gradually changing the frequency of the second electronic signal from the frequency f1 to a frequency different from that of the frequency f1 within the first time section 624. The control signal 523 of FIG. 5 may include a second control signal for restoring the frequency of the second electronic signal to the frequency f1 within the second time section 626.

The graph 630 of FIG. 6A illustrates a third electronic signal of a radio frequency band transmitted from an RF circuit to an antenna in an electronic device on a frequency band. The third electronic signal may include, for example, an electronic signal 570 in the first RF circuit 432 of FIG. 5. The electronic device according to an embodiment may transmit a control signal for generating the third electronic signal by adjusting a frequency of the second electronic signal to a frequency synthesizing circuit corresponding to the RF circuit. Referring to the graph 630, the frequency of the third electronic signal may be repeatedly changed along a period having a length of the time section 632. The length of the time section 632 may be shorter than the length of the first time section 624. The length of the first time section 624 may be a multiple of the length of the time section 632.

For example, within the first time section 634 included in the time section 632, the frequency of the third electronic signal may gradually increase from the frequency f2 to the frequency f3. Within the second time section 636 included in the time section 632 and distinguished from the first time section 634, the frequency of the third electronic signal may decrease from the frequency f3 to the frequency f2. At each of the beginning and end moment of the time section 632, the frequency of the third electronic signal may coincide with the frequency f2. All of the frequencies f2 and f3 may be included in the radio frequency band. For example, each of the frequencies f2 and f3 may be 24 GHz and 24.25 GHz.

According to an embodiment, the electronic device may transmit the third control signal distinguished from the first control signal and the second control signal to a frequency synthesizing circuit included in the RF circuit to generate a third electronic signal having a frequency that changes as shown in the graph 630 from the second electronic signal. For example, the controller 510 of FIG. 5 may transmit a third control signal for generating the third electronic signal by adjusting the frequency of the second electronic signal to the frequency synthesizing circuit 560 included in the first RF circuit 432.

Referring to FIG. 6B, within a time section between T0 and T1 of FIG. 6A, graphs 625, 630, 640, 650, 660, and 670 showing parameters included in the first control signal and the third control signal are illustrated. Graphs 625 and 670 illustrate reference signals output from a frequency synthesizing circuit receiving each of the first control signal and the third control signal within a frequency domain.

The graph 640 of FIG. 6B illustrates a parameter included in the first control signal that triggers a linear modification of the frequency of the first reference signal indicated by the graph 625. The first reference signal may include the reference signal 524 of FIG. 5. The parameter may represent a multiple to be applied to a frequency of a clock signal (e.g., clock signal 521 of FIG. 5) input to a frequency synthesizing circuit corresponding to the IF circuit outputting the second electronic signal. For example, when the length of the first time section 634 is 20 μs, the controller 510 of FIG. 5 may gradually increase the parameter included in the first control signal along a period (e.g., a period of the time section 642) of 1 μs. Referring to FIG. 6B, the parameter included in the first control signal may gradually increase by the numerical value b at every period of 1 μs from the numerical value a.

In an example embodiment, the frequency synthesizing circuit (e.g., the frequency synthesizing circuit 520 of FIG. 5) corresponding to the IF circuit may output a first reference signal (e.g., the reference signal 524 of FIG. 5) indicating a frequency of the second electronic signal, in response to identifying the parameter of the first control signal indicated by the graph 640, applying the identified parameter to the clock signal input to the frequency synthesizing circuit. For example, when the frequency of the clock signal is 52 MHz and the numerical value a is 154.113, the frequency of the first reference signal at the start point of the time section 632 is 8013.876 MHz (52 MHz×154.113) and may have a frequency of 8 GHz in the intermediate frequency band. For example, when the numerical value b is 0.267, the frequency of the first reference signal may gradually increase by 13.884 MHz every period (e.g., period of a time section 642) of 1 μs.

In an example embodiment, the frequency synthesizing circuit corresponding to the IF circuit may operate based on a Phase-Locked Loop (PLL) to be described later in FIG. 7. As the frequency synthesizing circuit operates based on the PLL, a high frequency component (e.g., 1 MHz component in the example that varies along a period of 1 μs) caused from a first control signal that changes stepwise along the graph 640 may be removed. The high frequency component may be removed based on, for example, a low band pass filter characteristic (e.g., a low-band pass filter having a cutoff frequency of 50 kHz to 100 kHz) of a frequency synthesizing circuit operating based on a PLL. As the high frequency component is removed, the first reference signal output from the frequency synthesizing circuit may linearly increase within a frequency domain as shown in graph 625. As the first reference signal is input to a frequency mixer (e.g., frequency mixer 543 of FIG. 5) of the IF circuit, the second electronic signal output from the frequency mixer may have a frequency linearly increased based on a frequency of the first reference signal. In this case, even if the electronic signal (e.g., the electronic signal 540 of FIG. 5) of the baseband received from the communication processor is a DC signal having a substantially corresponding frequency to 0, the electronic device may obtain the second electronic signal having a linearly increased frequency using the frequency synthesizing circuit.

Graphs 650 and 660 of FIG. 6B illustrate parameters included in the second control signal that cause a change in frequency of the second reference signal indicated by the graph 670. The second reference signal may include the reference signal 565 of FIG. 5. Each of the parameters represented by graphs 650 and 660 may correspond to denominator and a molecule of a fraction to be applied to a frequency of a clock signal (e.g., a clock signal 561 of FIG. 5) input to a frequency synthesizing circuit corresponding to the RF circuit outputting the third electronic signal from the second electronic signal.

For example, within the first time interval 634, when a numerical value c of the denominator indicated by graph 650 is 2, a numerical value d of the molecule indicated by graph 660 is 64, and a frequency of the clock signal input to the frequency synthesizing circuit corresponding to the RF circuit is 500 MHz, the frequency synthesizing circuit may output a second reference signal having a frequency of f5=16 GHz (500 MHz×64/2). As described above, in response to receiving the second electronic signal based on the first reference signal having a frequency of 8013.876 MHz at the beginning moment of the time section 632, in the frequency mixer (e.g., frequency mixer 554 of FIG. 5), a third electronic signal having a frequency of approximately f2=24.013 GHz (8013.876 MHz+16 GHz) may be output as a frequency of the radio frequency band. As the frequency of the first reference signal gradually increases within the first time section 634 as shown in the graph 625, the frequency of the third electronic signal generated by combining the frequency of the second reference signal having a preset frequency as shown in graph 670 and the frequency of the second electronic signal based on the frequency of the first reference signal may gradually increase within the first time section 634 as shown in graph 630.

Within the time section 632, in response to identifying the expiration of the first time section 634, the molecule indicated by the graph 660 may be reduced from the numerical value d to the numerical value e. The electronic device according to an embodiment may reduce a numerical value corresponding to the molecule indicated by parameters included in the second control signal to restore the frequency of the third electronic signal to a preset frequency (e.g., f2). The passage of the first time section 634 may be identified by, for example, the controller 510 of FIG. 5 by comparing the parameters of the first control signal indicated by the graph 640 with one or more preset thresholds.

Referring to FIG. 6B, when a numerical value d is 64 and a numerical value e is 63, the frequency of the second reference signal may be reduced to f6=15.75 GHz (500 MHz×63/2). Referring to FIG. 6B, within a second time section 636 in which a numerical value related to the second control signal is adjusted, as the frequency synthesizing circuit receiving the second control signal changes the frequency of the second reference signal as shown in the graph 670 based on a change in numerical value, the frequency of the third electronic signal may decrease as shown in the graph 630. As the first control signal indicated by the graph 640 is constantly maintained within the second time interval 636 in which the frequency of the second reference signal indicated by the graph 670 decreases, the third electronic signal indicated by the graph 630 may converge at the frequency f2 at the beginning moment of the time section 632, independently of the frequency drift. The frequency of the third electronic signal may decrease again, within the second time section 636, by the increased frequency during the first time section 634. After the second time section 636, as the frequency of the first reference signal gradually increases, as shown in the graph 625, the frequency of the third electronic signal may gradually increase again.

Referring to FIGS. 6A to 6B, according to an embodiment, the electronic device may periodically adjust the first reference signal and the second reference signal to generate a third electronic signal that repeatedly sweeps between frequencies f2 and f3 at each period having a length of the time section 632. Since the electronic device transmits a wireless signal corresponding to the third electronic signal, the frequency of the third electronic signal represented by the graph 630 may have a frequency of the wireless signal transmitted from the electronic device. The wireless signal having a frequency that changes based on the frequency of the third electronic signal may correspond to the chirp signal. In response to identifying the expiration of the first time section 624 having a length corresponding to a multiple (e.g., 16) of the length of the time section 632, the electronic device may restore the frequency of the second electronic signal to the frequency f1 of the intermediate frequency band, as in the second time section 626 (e.g., approximately 67 ns).

As described above, according to an example embodiment, the electronic device may generate a chirp signal that repeatedly sweeps between frequencies f2 and f3 at a preset first period (e.g., a length of a time section 632) by adjusting One or more control signals input to one or more frequency synthesizing circuits. As shown in FIGS. 6A to 6B, sweeping between frequencies f2 and f3 by the electronic device based on the chirp signal may be performed a plurality of times during a second period longer than the first period. The electronic device sweeping between frequencies f2 and f3 multiple times based on the second period may be performed to identify an external object more stably.

Hereinafter, an operation performed by the electronic device according to an embodiment during the second time section 626 will be described in detail with reference to FIGS. 7 to 8.

Figure 7:
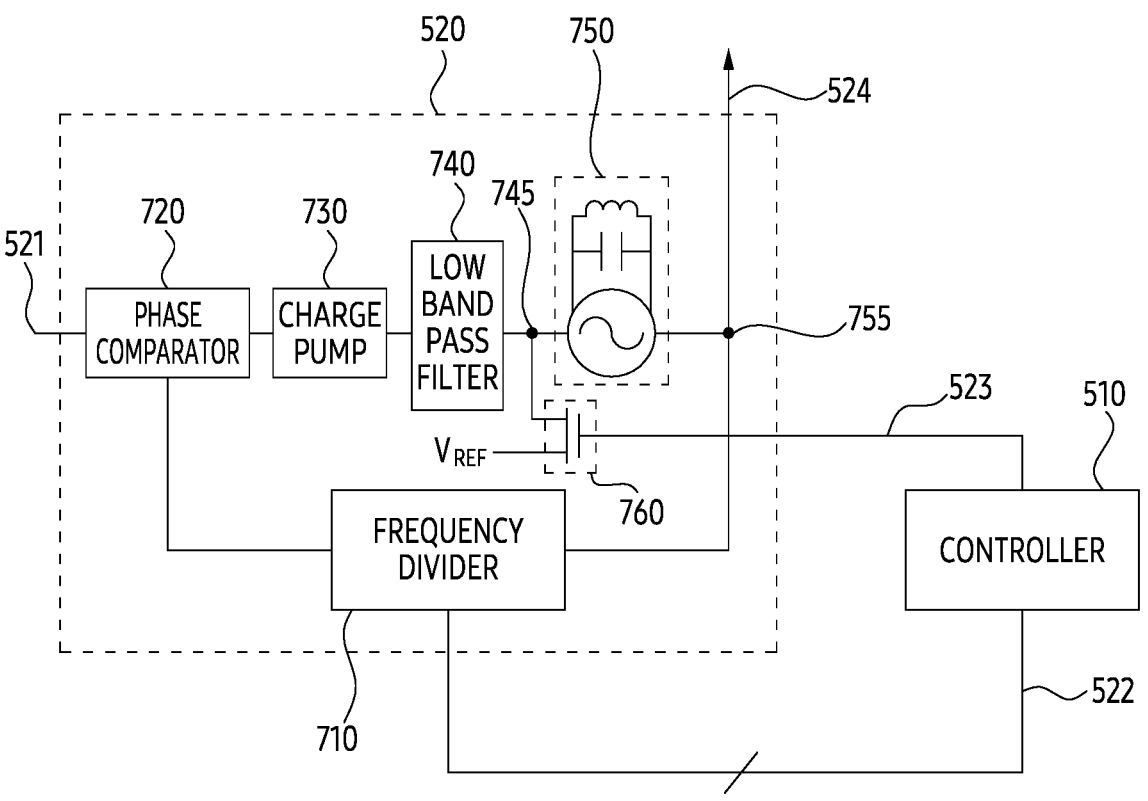
FIG. 7 is a diagram illustrating an example of a frequency synthesizing circuit included in an electronic device according to an example embodiment.

FIG. 7 is a diagram illustrating an example of a frequency synthesizing circuit 520 included in an electronic device according to an example embodiment. The electronic device of FIG. 7 may be an example of the electronic device 101 of FIGS. 1 to 5 and/or the electronic device of FIGS. 6A to 6B. For example, each of the frequency synthesizing circuit 520 and the controller 510 of FIG. 7 may correspond to the frequency synthesizing circuit 520 and the controller 510 of FIG. 5.

Referring to FIG. 7, according to an example embodiment, the frequency synthesizing circuit 520 of the electronic device may include a frequency divider 710, a phase comparator 720, a charge pump 730, a low band pass filter 740, and/or an oscillator 750. The frequency synthesizing circuit 520 may output a reference signal 524 based on the control signal 522 received from the clock signal 521 and the controller 510. For example, the reference signal 524 may have a frequency obtained by multiplying the frequency of the clock signal 521 by a multiple indicated by the control signal 522. In an embodiment in which the frequency synthesizing circuit 520 operates based on a PLL, the frequency synthesizing circuit 520 may include a feedback loop based on a frequency divider 710, a phase comparator 720, a charge pump 730, a low-band pass filter 740, an oscillator 750, and a node 755.

In the frequency synthesizing circuit 520 according to an embodiment, the voltage applied to the node 745 may include a control voltage of the oscillator 750. The control voltage may be the oscillation frequency of the oscillator 750, for example, the voltage of the reference signal 524 applied to the node 755 by the oscillator 750. The control voltage may be adjusted based on a frequency of the reference signal 524 input to the frequency divider 710 through the node 755, a parameter indicated by the control signal 522, and a frequency of the clock signal 521. The frequency divider 710, the phase comparator 720, the charge pump 730, and the low band pass filter 740 may adjust the magnitude of the control voltage applied to the node 745 based on the frequency of the reference signal 524, the parameter of the control signal 522, and the frequency of the clock signal 521.

The frequency synthesizing circuit 520 according to an embodiment may include a switch 760 connected to a node 745 to which a control voltage of the oscillator 750 is applied. The switch 760 may change the voltage of the node 745 to a preset voltage (e.g., Vref) based on the control signal 523 of the controller 510. The controller 510 according to an embodiment may activate the switch 760 using the control signal 523 in response to identifying the expiration of the frame (e.g., the first time section 624 of FIG. 6A) of the chirp signal. As the switch 760 is activated, the voltage of the node 745 may be changed to a preset voltage. The preset voltage may be a frequency of the oscillator 750 at the time when transmission of the chirp signal is initiated in order to initialize the frequency of the oscillator 750 (or the frequency of the reference signal 524).

Referring to the graph 620 of FIG. 6A, as the controller 510 activates the switch 760 using the control signal 523 in response to identifying the expiration of the first time section 624, during the second time section 626 after the first time section 624, the frequency of the second electronic signal having a frequency based on the frequency of the reference signal 524 transmitted from the frequency synthesizing circuit 520 may be initialized. The length of the second time section 626 of FIG. 6A may match the length of the time interval required to complete the change in the frequency of the reference signal 524 and/or the second electronic signal based on the activated switch 760.

As described above, the frequency synthesizing circuit 520 according to an embodiment may further comprise a switch 760 for adjusting a control voltage of the oscillator 750 in order to initialize the frequency of the reference signal 524. The switch 760 may be activated based on a control signal 523 of the controller 510. As the frequency synthesizing circuit 520 initializes the frequency of the reference signal 524 based on the control voltage of the oscillator 750, the frequency of the reference signal 524 may be initialized within a relatively short time (e.g., 30 μs or less). For example, when the frequency synthesizing circuit 520 increases the frequency of the reference signal 524 every 1 μs as shown in FIG. 6B, the frequency synthesizing circuit 520 may operate based on approximately 75 kHz. In this case, when adjusting a parameter that is included in the first control signal indicated by graph 640 of FIG. 6B (e.g., control signal 522 of FIGS. 5 and/or 7) and represents a multiple of clock signal 521, a time of approximately 67 μs may be required to initialize the frequency of the reference signal 524. The frequency synthesizing circuit 520 according to an embodiment may reduce the time for initializing the frequency of the reference signal 524 using a control signal 523 different from the control signal 522. In this case, the electronic device may resume transmission of the wireless signal based on the chirp signal within a relatively short time.

Hereinafter, an operation of the frequency synthesizing circuit 520 controlled by the control signal 523 will be described in detail with reference to FIG. 8.

Figure 8:
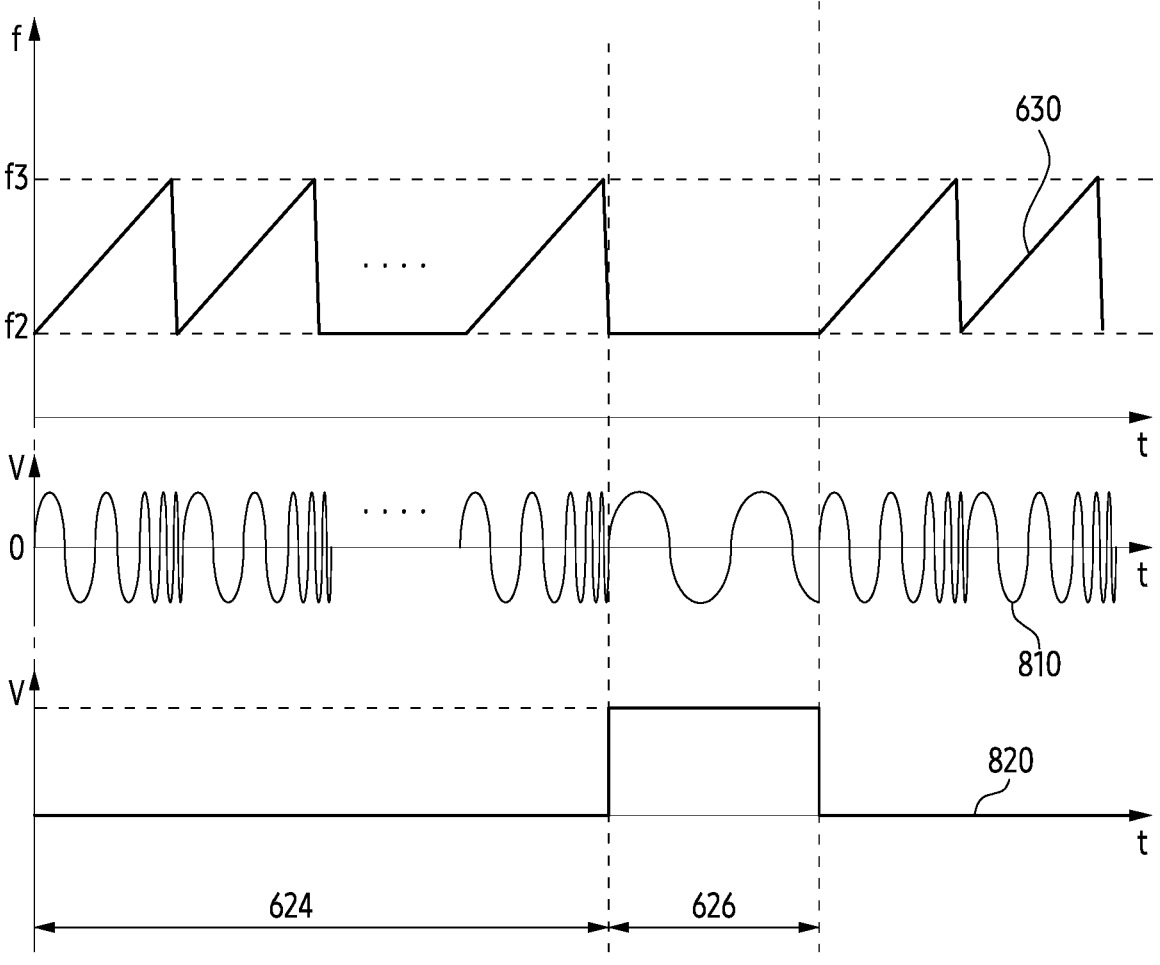
FIG. 8 is graphs for describing a wireless signal transmitted by an electronic device according to an example embodiment.

FIG. 8 is graphs for describing a wireless signal transmitted by an electronic device according to an example embodiment. The electronic device of FIG. 8 may be an example of the electronic device 101 of FIGS. 1 to 5 and/or the electronic device of FIGS. 6A to 6B and 7. For example, the graph 820 of FIG. 8 shows the voltage of the control signal 523 of FIG. 7 within a time domain.

Referring to the graph 820 of FIG. 8, in response to identifying the progress of the first time section 624 corresponding to one frame transmitting the chirp signal, the controller (e.g., the controller 510 of FIG. 5 and/or FIG. 7) included in the electronic device according to an embodiment may increase the voltage of the control signal (e.g., the control signal 523 of FIG. 5 and/or FIG. 7) input to the frequency synthesizing circuit (e.g., the frequency synthesizing circuit 520 of FIG. 7) to a preset voltage. The preset voltage of the control signal may correspond to a voltage for activating a switch (e.g., switch 760 of FIG. 7) for adjusting a control voltage of an oscillator (e.g., the oscillator 750 of FIG. 7) included in a frequency synthesizing circuit. Referring to FIG. 8, the voltage of the control signal may maintain a preset voltage during the second time section 626.

As the voltage of the control signal maintains the preset voltage during the second time section 626, the control voltage of the oscillator included in the frequency synthesizing circuit may be initialized as described above in FIG. 7. As the control voltage of the oscillator is initialized, the frequency of the reference signal (e.g., the reference signal 524 of FIGS. 5 and/or 7) output from the frequency synthesizing circuit including the oscillator may be initialized. The initialization of the reference signal may cause the initialization (e.g., the frequency of the third electronic signal is restored to a preset frequency f2) of the frequency of the third electronic signal to be converted into a wireless signal, as shown in the graph 630 in the second time section 626.

The graph 810 of FIG. 8 is an exemplary graph for explaining a waveform within a time domain of a wireless signal emitted by an electronic device based on a third electronic signal. Since the wireless signal is included in a radio frequency band including 24 GHz, the waveform of the wireless signal in the time domain has a waveform denser than the exemplary waveform of the graph 810. The wireless signal based on the chirp signal, like the graph 810 or 630, may have a preset amplitude and may have a frequency that gradually changes over time within the frequency domain.

Figure 9:
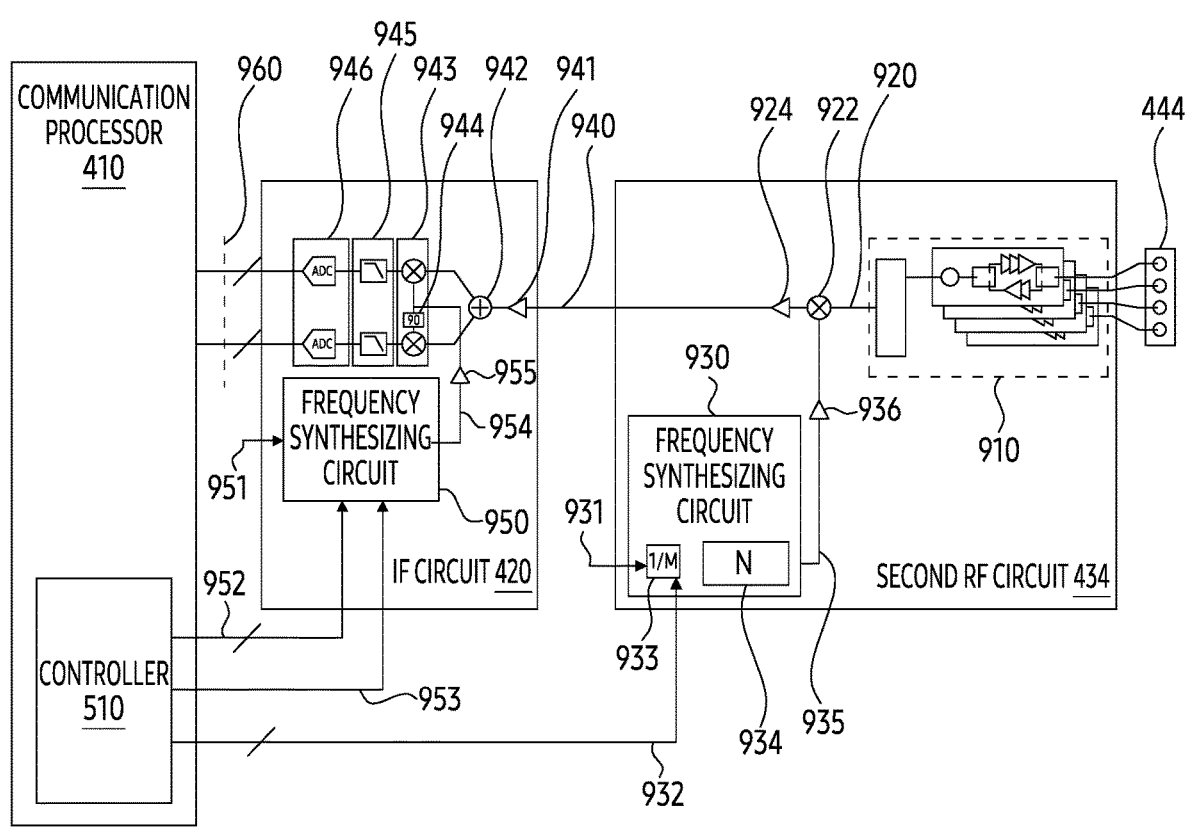
FIG. 9 is an exemplary diagram for describing an operation of receiving a wireless signal by an electronic device according to an example embodiment.

Hereinafter, an operation in which the electronic device according to an embodiment receives a reflection signal corresponding to the transmitted wireless signal based on the operation of the electronic device of FIGS. 4 to 8 will be described in detail with reference to FIG. 9. FIG. 9 is an exemplary diagram for describing an operation of receiving a wireless signal by the electronic device 101 according to an example embodiment. The electronic device 101 of FIG. 9 may be an example of the electronic device 101 of FIGS. 1 to 5 and/or the electronic device of FIGS. 6A to 6B and 7 to 8. For example, FIG. 9 is a diagram illustrating a portion of the electronic device 101 of FIG. 4 and may correspond to a portion of the electronic device 101 related to reception of a radar signal. Hereinafter, a description overlapping with the description of FIGS. 4 and/or 5 will be omitted.

Referring to FIG. 9, the second antenna array 444 of the electronic device 101 according to an embodiment may receive wireless signals (e.g., wireless signals 340 and 360 of FIG. 3) radiated toward the electronic device 101. For example, when the electronic device 101 transmits a radar signal based on the operation of FIG. 5, the second antenna array 444 may receive the reflection signal of the radar signal. In response to receiving the reflection signal of the radar signal, the second antenna array 444 may transmit an electric signal corresponding to the reflection signal.

Referring to FIG. 9, the second RF circuit 434 may adjust the frequency of the electronic signal received from the second antenna array 444 from the frequency included in the radio frequency band to the frequency included in the intermediate frequency band. The second RF circuit 434 may couple the electronic signal 920 passing through the phased array 910 and received from the second antenna array 444 to the reference signal 935 provided from the frequency synthesizing circuit 930 based on the frequency mixer 922. The frequency synthesizing circuit 930 of FIG. 9 may transmit a reference signal 935 for frequency conversion between the radio frequency band and the intermediate frequency band based on the control signal 932 provided from the controller 510 and the clock signal 931.

The frequency synthesizing circuit 930 of FIG. 9 may correspond to the frequency synthesizing circuit 560 of FIG. 5. For example, each of the frequency divider 933 and the frequency multiplier 934 of the frequency synthesizing circuit 930 may correspond to the frequency divider 563 and the frequency multiplier 564 of FIG. 5. Each of the clock signal 931 and the control signal 932 input to the frequency synthesizing circuit 930 may correspond to the clock signal 561 and the control signal 562 of FIG. 5.

Referring to FIG. 9, in the frequency mixer 922, as the electronic signal 920 and the reference signal 935 are coupled (e.g., down-conversion), an electronic signal 940 having a frequency of an intermediate frequency band may be output from the second RF circuit 434. The second RF circuit 434 may further include an amplifier 936 for amplifying the reference signal 935 transmitted to the frequency mixer 922, and/or an amplifier 924 for amplifying the electronic signal output from the frequency mixer 922.

Referring to FIG. 9, the electronic signal 940 output from the second RF circuit 434 may be coupled to the reference signal 954 transmitted from the frequency synthesizing circuit 950 by the frequency mixer 943. The IF circuit 420 may include an amplifier 941 for amplifying an electronic signal 940 input to the frequency mixer 943, and a signal divider 942 for separating the electronic signal 940 into an I signal and a Q signal. Reference signal 954 may be transmitted to mixer 943 via amplifier 955.

Referring to FIG. 9, the frequency synthesizing circuit 950 may correspond to the frequency synthesizing circuit 520 of FIG. 5. For example, each of the clock signals 951 input to the frequency synthesizing circuit 950 and the control signals 952 and 953 may correspond to the clock signals 521 of FIG. 5, and the control signals 522 and 523.

Referring to FIG. 9, the electronic signal 940 coupled to the reference signal 954 by the frequency mixer 943 may sequentially pass through the LPF 945 and the ADC 946 and be converted into an electronic signal 960 in a baseband to be transmitted to the communication processor 410. The frequency mixer 943 may include a phase shifter 944 to generate I signal and Q signal. The communication processor 410 according to an embodiment may execute an FMCW radar function based on the received electronic signal 960 in response to receiving the electronic signal 960. For example, after combining the electronic signal 540 of FIG. 5 and the electronic signal 960 of FIG. 9 and performing an FFT operation, the communication processor 410 may identify frequency of electronic signals combined with the electronic signals 540 of FIG. 5 and 960 of FIG. 9. The frequency identified by the communication processor 410 may be changed based on a distance between the electronic device 101 and an external object. An operation in which the electronic device 101 according to an embodiment identifies a distance between the electronic device 101 and an external object based on the electronic signal 540 of FIG. 5 and the electronic signal 960 of FIG. 9 will be described later with reference to FIG. 11.

Hereinafter, electronic signals 920, 940, and 960 of FIG. 9 will be described in detail with reference to FIG. 10.

Figure 10:
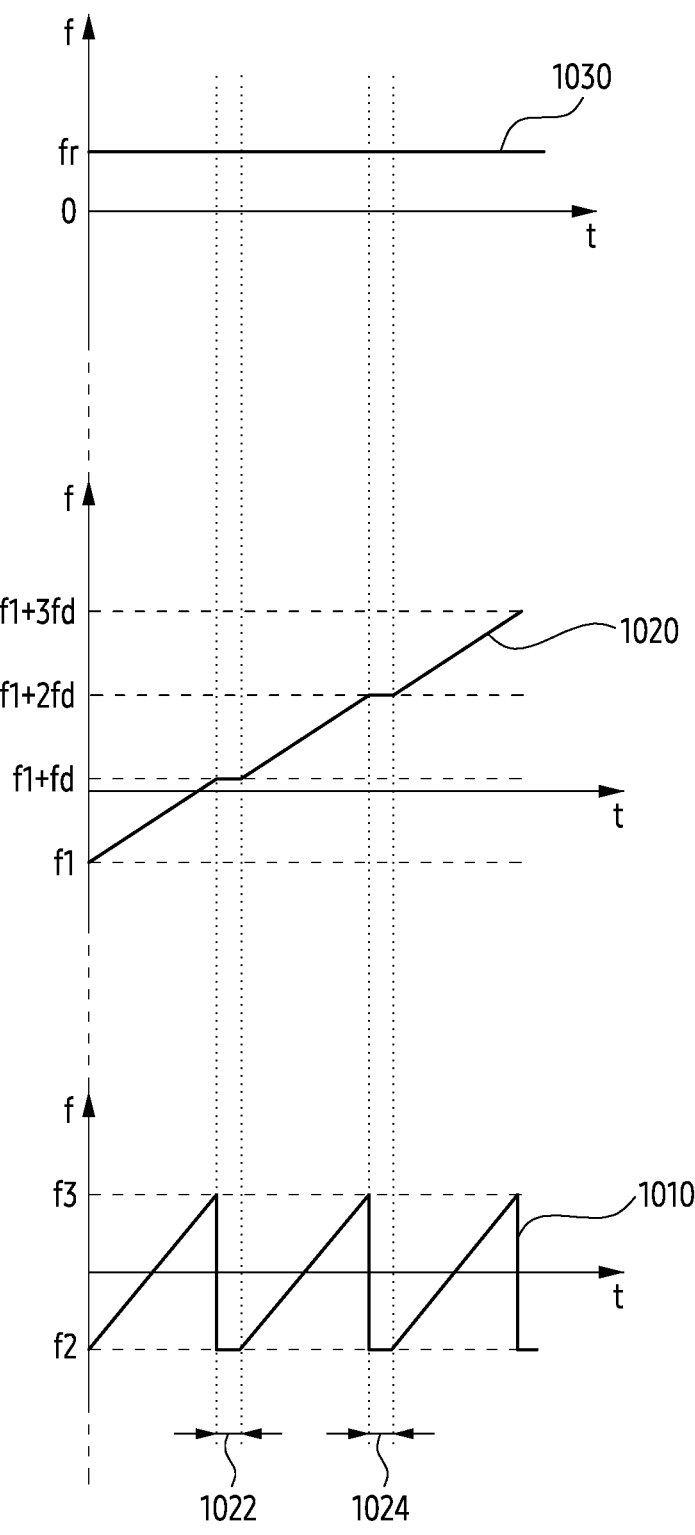
FIG. 10 is a graph describing an electronic signal transmitted in an electronic device while the electronic device receives a wireless signal according to an example embodiment.

FIG. 10 is graphs 1010, 1020, and 1030 for describing an electronic signal transmitted in the electronic device while the electronic device receives the wireless signal according to an example embodiment. The electronic device of FIG. 10 may be an example of the electronic device 101 of FIGS. 1 to 5 and 9 and/or the electronic device of FIGS. 6A to 6B and 7 to 8.

The graph 1010 of FIG. 10 illustrates a first electronic signal received from an antenna of an electronic device within a frequency domain. The first electronic signal may include, for example, the electronic signal 920 of FIG. 9. Since the first electronic signal represents a reflection signal of a wireless signal (e.g., a wireless signal emitted from the first antenna array 442 of FIG. 5), a waveform of the first electronic signal may be related to a waveform of the chirp signal. For example, f2 to f3 of the graph 1010 of FIG. 10 may be f2=24 GHz and f3=24.25 GHz of FIG. 6A as frequencies included in the radio frequency band.

The graph 1020 of FIG. 10 illustrates a second electronic signal transmitted from an RF circuit of an electronic device to an IF circuit within a frequency domain. The second electronic signal may correspond to, for example, the electronic signal 940 of FIG. 9. The second electronic signal may have a frequency that gradually increases from f1 (e.g., 8 GHz) of the intermediate frequency band, based on the reference signal of the frequency synthesizing circuit (e.g., the frequency synthesizing circuit 930 of FIG. 9) corresponding to the RF circuit. Since the second electronic signal is generated from a reflection signal of a wireless signal generated based on the reference signal, a delay generated as the wireless signal is reflected may be obtained.

Referring to FIG. 10, as in time section 1022 and 1024, within one frame of the chirp signal, the frequency of the second electronic signal may be temporarily maintained constant every fd=0.25 GHz. Within the time section 1022 and 1024, a frequency change (e.g., a frequency decrease of 250 MHz) may occur in the frequency synthesizing circuit. The frequency synthesizing circuit is a frequency synthesizing circuit corresponding to the RF circuit and may be the frequency synthesizing circuit 930 of FIG. 9. As the time section 1022 and 1024 in which the frequency of the second electronic signal is constantly maintained coincide with one or more time section in which the frequency of the frequency synthesizing circuit is adjusted, the frequency adjustment of the frequency synthesizing circuit may be performed independently of frequency drift.

The graph 1030 of FIG. 10 shows a third electronic signal transmitted from an IF circuit of an electronic device to a communication processor within a frequency domain. The third electronic signal may correspond to, for example, the electronic signal 960 of FIG. 9. The frequency of the third electronic signal may be changed to a frequency fr of a baseband based on a reference signal of a frequency synthesizing circuit (e.g., the frequency synthesizing circuit 950 of FIG. 9) corresponding to the IF circuit. The frequency fr of the baseband may indicate a phase difference between the radar signal transmitted from the electronic device and the reflection signal of the radar signal or a delay of the reflection signal compared to the radar signal. The frequency fr of the baseband may indicate a distance between the electronic device and the external object. Hereinafter, referring to FIG. 11, an operation of identifying a distance between the electronic device and the external object based on the frequency fr of the baseband according to an embodiment will be described in detail.

Figure 11:
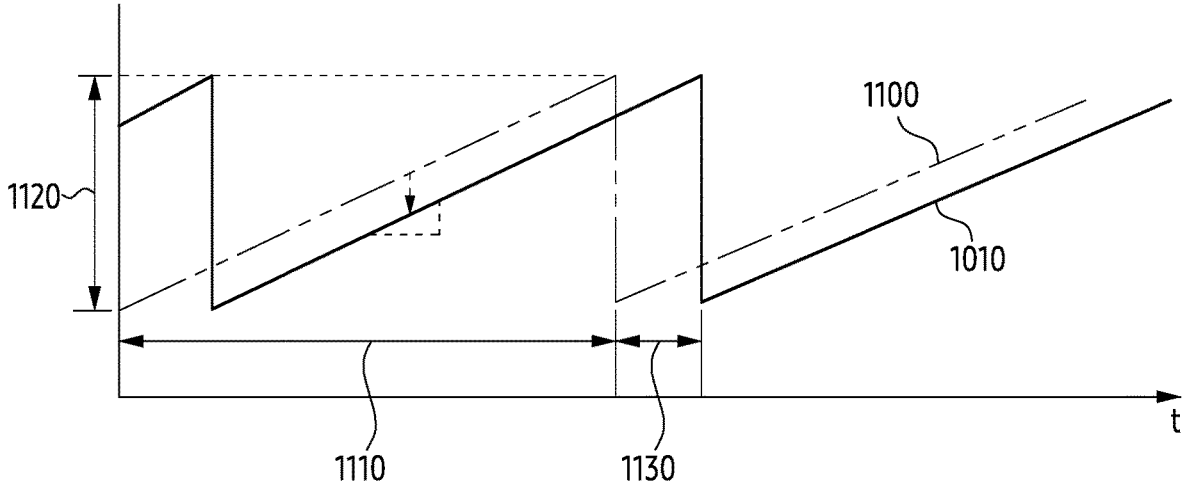
FIG. 11 is a graph describing an operation in which an electronic device identifies a distance between an electronic device and a subject using a wireless signal, according to an example embodiment.

FIG. 11 is a graph illustrating an operation in which an electronic device identifies a distance between an electronic device and a subject using a wireless signal, according to an example embodiment. The electronic device of FIG. 11 may be an example of the electronic device 101 of FIGS. 1 to 5, FIGS. 9 and/or the electronic device of FIGS. 6A to 6B, FIGS. 7 to 8, and 10.

The graph 1100 of FIG. 11 is a radio signal (e.g., a radar signal) emitted from an electronic device, and for example, represents a radio signal generated from an electronic signal indicated by the graph 630 of FIG. 6 in a frequency domain. The graph 1010 of FIG. 11 shows an electronic signal (e.g., the third electronic signal of FIG. 10) representing the reflection signal of the wireless signal within a frequency domain.

Referring to graphs 1100 and 1010, as the wireless signal is emitted from the electronic device and then reflected by an external object and returned to the electronic device, a delay may occur between the wireless signal and the reflection signal of the wireless signal. When the distance between the electronic device and the external object is R, the magnitude of the delay is 2R/c with respect to the speed $c=3\times10^8$ m/s of light. For example, the length of the time section 1130 between the graphs 1100 and 1010 of FIG. 11 generated by the delay is $\Delta t=2R/c$.

The electronic device according to an embodiment may obtain a frequency indicating the time section 1130 based on the FMCW radar function. The frequency may be, for example, a frequency (e.g., fr of FIG. 10) of an electronic signal in a baseband corresponding to a reflection signal. For example, for a magnitude Bw of the frequency interval 1120 of FIG. 11 and a length Tc of one period 1110 of the radio signal, the frequency corresponding to the reflection signal is fr=2R/c×Bw/Tc. The electronic device according to an embodiment may identify a distance between the electronic device and an external object from a frequency of an electronic signal in a baseband obtained by converting a reflection signal.

Hereinafter, an example of a structure of an electronic device for transmitting and receiving a radar signal will be described in detail with reference to FIG. 12.

Figure 12:
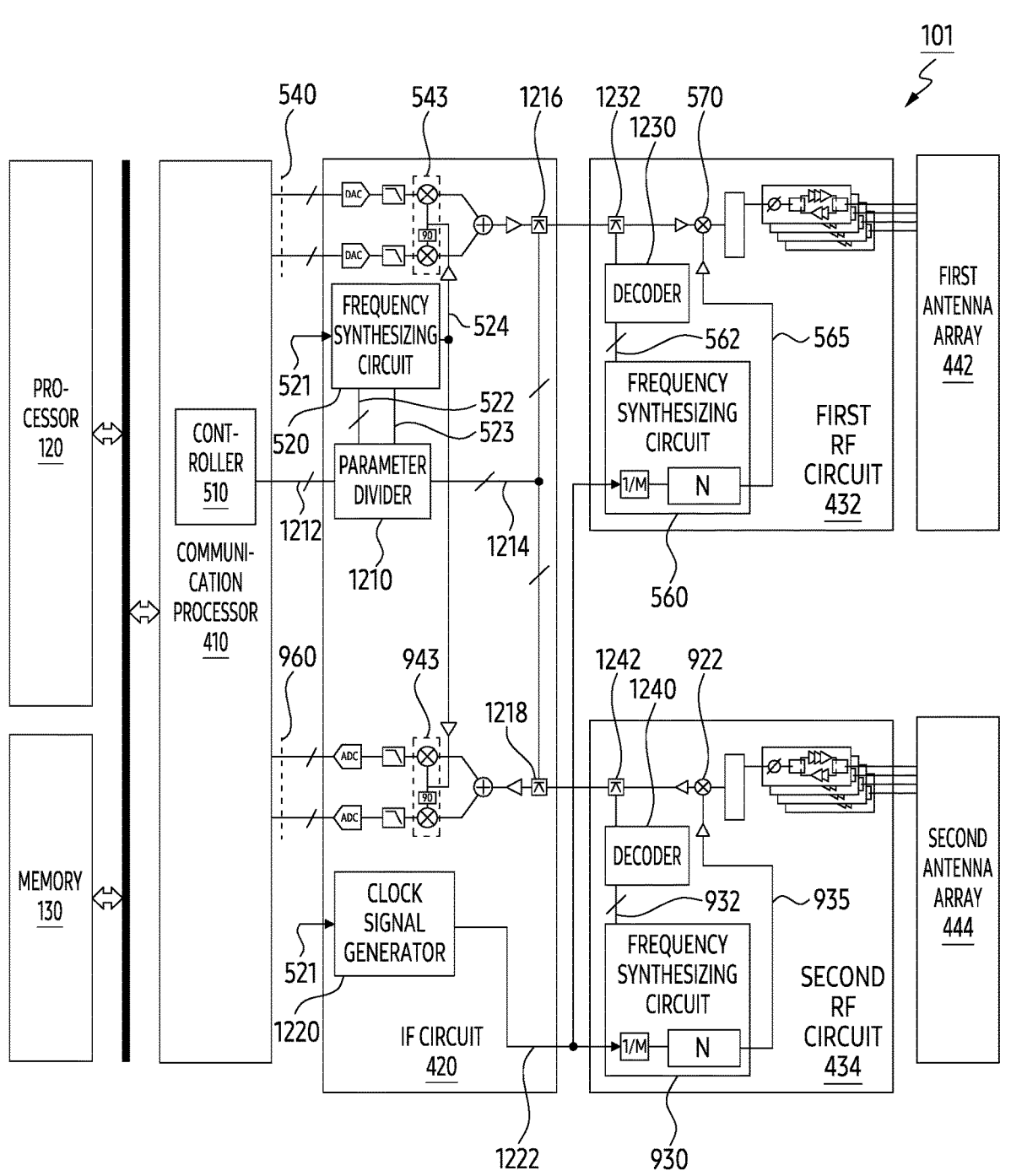
FIG. 12 is an exemplary diagram describing a structure of an electronic device according to an example embodiment.

FIG. 12 is an exemplary diagram illustrating a structure of the electronic device 101 according to an example embodiment. The electronic device 101 of FIG. 12 may be an example of the electronic device 101 of FIGS. 1 to 5 and 9 and/or the electronic device of FIGS. 6A to 6B, 7 to 8, and 10 to 11. Hereinafter, descriptions overlapping those of FIGS. 4, 5, and/or 9 will be omitted.

Referring to FIG. 12, according to an example embodiment, the electronic device 101 may transmit and/or receive a radar signal using a communication processor 410, IF circuit 420 for wireless data transmission, an IF, one or more RF circuits (e.g., the first RF circuit 432 and/or the second RF circuit 434) and one or more antennas (e.g., the first antenna array 442 and/or the second antenna array 444). In order to transmit and/or receive radar signals, the electronic device 101 according to an embodiment may include a controller 510 for adjusting frequencies used for frequency conversion of an IF circuit 420 and/or one or more RF circuits based on a chirp signal.

The controller 510 of the electronic device 101 according to an embodiment may transmit one or more control signals to the IF circuit 420 and/or one or more RF circuits through a digital interface. Referring to FIG. 12, an electronic signal 1212 transmitted from the controller 510 to the parameter divider 1210 may be transmitted through a digital interface. The parameter divider 1210 of the electronic device 101 according to an embodiment may transmit control signals included in the electronic signal 1212 to frequency synthesizing circuits (e.g., any one of frequency synthesizing circuits 520, 560, and 930, respectively).

For example, the control signals 522 and 523 transmitted by the parameter divider 1210 to the frequency synthesizing circuit 520 corresponding to the IF circuit 420 may be used to generate a reference signal 524 for adjusting a frequency of an electronic signal in an intermediate frequency band to be output from the IF circuit 420 by the frequency synthesizing circuit 520. Referring to FIG. 12, the reference signal 524 may be transmitted from the electronic signal 540 received from the communication processor 410 to a frequency mixer 543 for generating an electronic signal of an intermediate frequency band, and/or a frequency mixer 943 for generating an electronic signal 960 of a base band.

The electronic device 101 according to an embodiment may include a clock signal generator 1220 that generates a clock signal 1222 to be used in one or more frequency synthesizing circuits corresponding to each of the one or more RF circuits based on the clock signal 521 input to the frequency synthesizing circuit 520 corresponding to the IF circuit 420. The clock signal 521 may be generated based on, for example, a crystal oscillator. Referring to FIG. 12, The clock signal generator 1220 may transmit the clock signal 1222 having a frequency (e.g., 500 MHz) multiplied by a preset multiple by a frequency (e.g., 52 MHz) of clock signal 521, to the frequency synthesizing circuits 560 and 930 corresponding to each of the first RF circuit 432 and the second RF circuit 434. The clock signal 1222 may correspond to, for example, the clock signal 561 of FIG. 5 and/or the clock signal 931 of FIG. 9.

The electronic device 101 according to an embodiment may include filters 1216, 1218, 1232, and 1242 for transmitting an electronic signal 1214 from the parameter divider 1210 to one or more RF circuits. The electronic signal 1214 may represent one or more parameters included in a control signal to be transmitted to RF circuits based on serialized bits. Referring to FIG. 12, an electronic signal transmitted from the IF circuit 420 to the first RF circuit 432, having a frequency of an intermediate frequency band indicated by the reference signal 524, may pass through the filters 1216 and 1232, and be transmitted to the frequency mixer 570 of the first RF circuit 432. Referring to FIG. 12, an electronic signal 1214 transmitted from the parameter divider 1210 to the first RF circuit 432 may be transmitted to the decoder 1230 through the filters 1216 and 1232. Referring to FIG. 12, an electronic signal 1214 transmitted from the parameter divider 1210 to the second RF circuit 434 may be transmitted to the decoder 1240 through the filters 1218 and 1242. The electronic signals 562 and 932 decoded by each of the decoders 1230 and 1240 may be transmitted to each of the frequency synthesizing circuits 560 and 930 corresponding to each of the first RF circuit 432 and the second RF circuit 434. Each of the electronic signals 562 and 932 may correspond to the control signal 562 of FIG. 5 and the control signal 932 of FIG. 9.

Referring to FIG. 12, in the first RF circuit 432, an electronic signal of a radio frequency band may be generated as an electronic signal of an intermediate frequency band is coupled to a reference signal 565 by a frequency mixer 570. A wireless signal corresponding to the generated electronic signal may be emitted to an external space of the electronic device 101 through the first antenna array 442.

When the radio signal is reflected by an external object, as the reflection signal corresponding to the radio signal reaches the second antenna array 444, an electronic signal in a radio frequency band corresponding to the reflection signal may be output from the second antenna array 444. As the electronic signal output from the second antenna array 444 is coupled to the reference signal 935 by the frequency mixer 922, an electronic signal of an intermediate frequency band may be generated. The electric signal of the intermediate frequency band generated by the frequency mixer 922 may pass through the filters 1242 and 1218 to be transmitted from the second RF circuit 434 to the frequency mixer 943 of the IF circuit 420. As the electronic signal of the intermediate frequency band generated by the frequency mixer 922 is combined with the reference signal 524 transmitted from the frequency synthesizing circuit 520 in the frequency mixer 943, the electronic signal 960 of the base band may be generated. In response to receiving the electronic signal 960, the communication processor 410 may perform an operation related to the electronic signal 960 (e.g., perform an FFT operation on the electronic signal 960), and obtain information used to identify at least one of a distance between the electronic device 101 and an external object by the processor 120 or the speed of an external object. The information may be transmitted to the processor 120 or the memory 130 by the communication processor 410.

As described above, according to an embodiment, the electronic device 101 may transmit and/or receive radar signals corresponding to the chirp signals using one or more frequency synthesizing circuits (e.g., frequency synthesizing circuits 520, 560, and 930 of FIGS. 5, 7 and/or 12). Independently of the DAC converting the digital electronic signal of the baseband into an analog electronic signal in the IF circuit, the electronic device 101 may generate a radar signal. Similarly, independently of the ADC converting the reflection signal into analog-digital in the IF circuit, the electronic device 101 may process the reflection signal of the radar signal.

FIG. 13 is a flowchart illustrating an operation of an electronic device according to an example embodiment. The electronic device of FIG. 13 may be an example of the electronic device 101 of FIGS. 1 to 5, 9, and 12 and/or the electronic device of FIGS. 6A to 6B, 7 to 8, and 10 to 11. The operation of FIG. 13 may be performed, for example, by the communication processor 410 of FIG. 4 and/or the controller 510 of FIGS. 5, 9 and/or 12.

Referring to FIG. 13, in operation 1310, the electronic device according to an embodiment may identify a request for outputting a wireless signal for identifying a distance between the electronic device and an external object. The request may be included in a signal transmitted from a processor (e.g., the processor 120 of FIGS. 1 to 2, 4, and/or 12) included in the electronic device to the communication processor (e.g., communication processor 410 of FIGS. 4, 5, 9, and/or 12).

Referring to FIG. 13, in operation 1315, the electronic device according to an embodiment may sequentially obtain a first electronic signal in an intermediate frequency band and a second electronic signal in a radio frequency band from a DC signal. The DC signal may be an electronic signal (e.g., the electronic signal 540 of FIGS. 5 and/or 9) transmitted to the communication processor of the electronic device and may be an electronic signal of a base band.

The first electronic signal obtained by the electronic device according to an embodiment may be generated by an IF circuit (e.g., the IF circuit 420 of FIGS. 4, 5, to 12) included in the electronic device and/or a frequency synthesizing circuit (e.g., the frequency synthesizing circuit 520 of FIGS. 5 and/or 12) corresponding to the IF circuit. For example, the controller 510 of the electronic device (e.g., the controller 510 of FIGS. 5, 7, 9, and/or 12) may adjust the frequency of the first electronic signal by using a control signal transmitted to the frequency synthesizing circuit corresponding to the IF circuit.

According to an embodiment, the second electronic signal obtained by the electronic device based on operation 1315 may be generated by an RF circuit (e.g., the first RF circuit 432 of FIGS. 4, 5, and/or 12) included in the electronic device and/or a frequency synthesizing circuit (e.g., the frequency synthesizing circuit 560 of FIGS. 5, 7 and/or 12) corresponding to the RF circuit. For example, the controller of the electronic device may adjust the frequency of the second electronic signal by using a control signal transmitted to the frequency synthesizing circuit corresponding to the RF circuit. The electronic device adjusting the frequency of the first electronic signal and/or the second electronic signal using the control signal may be related to, for example, the operation of the electronic device described above with reference to FIGS. 6A to 6B.

Referring to FIG. 13, in operation 1320, the electronic device according to an embodiment may initiate transmission of a wireless signal based on the second electronic signal obtained in operation 1315. After Initiating transmission of the wireless signal, in operation 1325, the electronic device according to an embodiment may initiate receiving a reflection signal corresponding to the wireless signal transmitted based on operation 1320.

Referring to FIG. 13, in operation 1330, the electronic device according to an embodiment may determine whether the frequency of the wireless signal has been maintained as a first preset period. The first preset period may have, for example, a length of the time section 642 of FIG. 6B. Before the frequency of the wireless signal is maintained by the first preset period (1330—No), the electronic device according to an embodiment may maintain transmission of the wireless signal based on a preset frequency.

In operation 1335, in response to identifying that the frequency of the radio signal has been maintained by a first preset period (1330—Yes), the electronic device according to an embodiment may increase the frequency of the radio signal by the first frequency interval by changing the frequency of the first electronic signal in the intermediate frequency band. The first frequency interval may be related to, for example, a slope of a frequency of a radio signal that gradually increases based on a chirp signal.

Referring to FIG. 13, in operation 1340, according to an embodiment, the electronic device may identify whether increasing the frequency at each first preset period of operation 1335 is repeated by a preset number of times corresponding to the second preset period. The second preset period may be, for example, the length of the first time section 634 of FIGS. 6A to 6B. In response to identifying that an increase in frequency based on operation 1335 is repeatedly performed less than a preset number of times corresponding to the second preset period (1340—No), the electronic device according to an embodiment may repeatedly perform operations (1330, or 1335).

In operation 1345, in response to identifying that an increase in frequency based on operation 1335 is repeatedly performed by a preset number of times corresponding to the second preset period (1340—YES), the electronic device according to an embodiment may change the frequency of the second electronic signal in the radio frequency band to reduce the frequency of the radio signal by a second frequency interval longer than the first frequency interval. The second frequency interval is an interval of frequencies of radio signals increased as operations 1330, 1335, and 1340 are repeatedly performed and for example, the frequency interval of operation 1335 may correspond to a frequency multiplied by a preset number of operations 1340. The electronic device according to an embodiment may perform operation 1345 within, for example, the second time section 636 of FIGS. 6A to 6B.

Referring to FIG. 13, in operation 1350, according to an embodiment, the electronic device may identify whether a third preset period corresponding to a preset number of second preset periods has elapsed after transmission of the wireless signal in operation 1320. The third preset period may have, for example, a length of the first time section 624 of FIGS. 6A to 6B and/or 8. After transmission of the wireless signal in operation 1320, the electronic device may repeatedly perform operations 1330, 1335, 1340, or 1345 before the third preset period has elapsed.

In operation 1355, in response to identifying that a third preset period has elapsed after transmission of the wireless signal in operation 1320, the electronic device according to an embodiment may identify at least one of a distance between a subject and an electronic device causing a reflective signal or a speed of the subject based on the reflection signal received based on operation 1325. In operation 1355, the electronic device according to an embodiment may obtain information (e.g., frequency of the reflection signal) indicating a distance between the subject and the electronic device based on the reflection signal received based on operation 1325. The obtained information may be transmitted, for example, from a communication processor included in an electronic device to the processor. In operation 1355, the electronic device according to an embodiment may restore frequencies of the first electronic signal in the intermediate frequency band and the second electronic signal in the radio frequency band to frequencies of operation 1315.

FIG. 14 is a flowchart illustrating an operation performed by an electronic device using one or more frequency synthesizing circuits according to an example embodiment. The electronic device of FIG. 14 may be an example of the electronic device 101 of FIGS. 1 to 5, 9, and 12 and/or an example of electronic device of FIGS. 6A to 6B, 7 to 8, 10 to 11, and/or 13. The operation of FIG. 14 may be performed, for example, by the communication processor 410 of FIG. 4 and/or the controller 510 of FIGS. 5, 9 and/or 12. At least one of the operations of FIG. 14 may be related to at least one of the operations of FIG. 13. For example, at least one of the operations of FIG. 14 may be performed in response to identifying the request of FIG. 13.

Referring to FIG. 14, in operation 1410, the electronic device according to an embodiment may initialize a first parameter corresponding to a first frequency synthesizing circuit and representing a frequency of an intermediate frequency band. The first frequency synthesizing circuit may include the frequency synthesizing circuit 520 of FIG. 5 or 12 and/or the frequency synthesizing circuit 950 of FIG. 9. The first parameter may include the control signal 522 of FIG. 5 or 12 and/or the control signal 952 of FIG. 9. The first parameter may represent, for example, a frequency of an intermediate frequency band based on a multiple to be applied to a frequency of a clock signal input to the first frequency synthesizing circuit.

Referring to FIG. 14, in operation 1415, the electronic device according to an embodiment may initialize a second parameter and a third parameter corresponding to a second frequency synthesizing circuit and indicating a frequency of a radio frequency band. The second frequency synthesizing circuit may include the frequency synthesizing circuit 560 of FIG. 5 or 12 and/or the frequency synthesizing circuit 930 of FIG. 9. The second parameter may represent a molecule of a fraction to be applied to a frequency of a clock signal input to the second frequency synthesizing circuit. The third parameter may represent a denominator of a fraction to be applied to the frequency.

Referring to FIG. 14, in operation 1420, the electronic device according to an embodiment may transmit a radio signal having a frequency adjusted based on the first to third parameters during the first preset period. For example, the electronic device may perform operation 1420 similar to operation 1330 of FIG. 13.

Referring to FIG. 14, in operation 1425, the electronic device according to an embodiment may increase a counter indicating the number of times the first preset period has elapsed by 1. The counter may be stored, for example, in a register of a communication processor (e.g., the communication processor 410 of FIGS. 4, 5, 9, and/or 12). Referring to operations 1420 and 1425, an electronic device increasing the counter may be performed every first preset period.

Referring to FIG. 14, in operation 1430, the electronic device according to an embodiment may determine whether the counter increased by operation 1425 is equal to or greater than the first threshold. For example, the electronic device may compare the counter increased by operation 1425 and the first threshold. The first threshold may be, for example, a quotient obtained by dividing the length of the frame of the chirp signal by the first preset period of operation 1420. When the counter of operation 1425 does not correspond to the first threshold, or the counter of operation 1425 is less than the first threshold (1430—No), in operation 1435, the electronic device according to an embodiment may adjust the first parameter of operation 1410 based on the first numerical value. For example, the electronic device may increase the first parameter by a first numerical value. For example, the first numerical value may indicate a frequency interval in which a frequency of a wireless signal increases during the first preset period based on a chirp signal.

Referring to FIG. 14, in operation 1440, the electronic device according to an embodiment may determine whether the counter increased by operation 1425 matches a multiple of the second threshold or the second threshold. The second threshold is a threshold indicating the second preset period of operation 1340 of FIG. 13, and may be, for example, a quotient obtained by dividing the length of the first time section 634 of FIGS. 6A to 6B by the first preset period of operation 1420. When the counter of operation 1425 does not match the multiple of the second threshold or the second threshold (1440—No), the electronic device may perform operation 1420. As the electronic device performs operation 1420, the electronic device may transmit a radio signal having a frequency adjusted based on the first parameter adjusted based on operation 1435. Since the second threshold is less than the first threshold, operations 1420, 1425, 1430, 1435, and 1440 may be repeatedly performed before the counter of operation 1425 reaches a multiple of the second threshold or the second threshold.

When the counter of operation 1425 coincides with a multiple of the second threshold or the second threshold (1440—Yes), in operation 1445, the electronic device according to an embodiment may adjust the second parameter of operation 1415 based on the second numerical value. The second numerical value may be a frequency increased by the first parameter increased as operations 1435 are repeatedly performed.

Referring to FIG. 14, in operation 1450, the electronic device according to an embodiment may transmit a radio signal based on the first parameter adjusted based on operation 1435 and the adjusted second parameter during the first preset period. As the electronic device adjusts the frequency of the radio signal based on the second parameter adjusted based on operation 1450, the frequency of the radio signal may be restored to a frequency before being increased by repeated execution of operations 1435. After operation 1450, the electronic device may perform operations 1430, 1435, and 1440 again.

When the counter of operation 1425 is greater than or equal to the first threshold (1430—Yes), the electronic device according to an embodiment may initialize first to third parameters of operations 1410 and 1415. Since the first threshold represents the length of the frame of the chirp signal, operation 1455 may be performed in response to identifying the progress of one frame of the chirp signal.

Referring to FIG. 14, in operation 1460, the electronic device according to an embodiment may transmit a control signal having a preset voltage to an oscillator included in the first frequency synthesizing circuit during a second time section different from the first preset period of operation 1420. The control signal of operation 1460 may include, for example, the control signal 523 of FIGS. 5 and/or 7. The control signal of operation 1460 may be transmitted, for example, within the second time section 626 in the graph 820 of FIG. 8. After the oscillator is initialized based on the control signal, the electronic device may resume transmission of the wireless signal related to the chirp signal based on the new frame.

As described above, in an embodiment, an electronic device (e.g., the electronic device 101 of FIGS. 1 to 5) may comprise a first frequency synthesizing circuit (e.g., the frequency synthesizing circuit 520 of FIG. 5) outputting a second electronic signal (e.g., reference signal 524 of FIG. 5) for converting a frequency of a first electronic signal (e.g., the electric signal 540 of FIG. 5) to a frequency in a first preset frequency bandwidth, based on a first clock signal (e.g., the clock signal 521 of FIG. 5); a second frequency synthesizing circuit (e.g., the frequency synthesizing circuit 560 of FIG. 5) (e.g., the communication processor 410 of FIGS. 4 to 5) outputting a fourth electronic signal (e.g., reference signal 565 of FIG. 5) for converting a frequency of a third electronic signal (e.g., the electronic signal 550 of FIG. 5) obtained from the first electronic signal at least based on the second electronic signal to a frequency in a second preset frequency bandwidth different from the first preset frequency bandwidth, based on a second clock signal (e.g., the clock signal 561 of FIG. 5) different from the first clock signal; and a communication processor operably coupled to the first frequency synthesizing circuit and the second frequency synthesizing circuit, wherein the communication processor may be configured to transmit to the first frequency synthesizing circuit, a first parameter (e.g., parameters included in the control signal 522 of FIG. 5)

indicating a frequency of the second electronic signal based on a frequency of the first clock signal, and changing based on a first preset frequency interval according to a first preset period; and transmit, to the second frequency synthesizing circuit, a second parameter (e.g., the control signal 562 of FIG. 5) indicating a frequency of the fourth electronic signal based on a frequency of the second clock signal, and changing based on a second preset frequency interval different from the first preset frequency interval.

For example, the electronic device may further comprise an intermediate frequency circuit (for example, the IF circuit 420 of FIGS. 4 to 5) outputting the third electronic signal, by converting the frequency of the first electronic signal to the frequency in the first preset frequency bandwidth associated with an intermediate frequency bandwidth, based on the second electronic signal outputted from the first frequency synthesizing circuit; and a radio frequency circuit (for example, the first RF circuit 432 of FIGS. 4 to 5) outputting a fifth electronic signal, by converting a frequency of the third electronic signal to the frequency in the second preset frequency bandwidth associated with a radio frequency bandwidth, based on the fourth electronic signal outputted from the second frequency synthesizing circuit.

For example, the communication processor may be configured to compensate change of a frequency of the fifth electronic signal by adjusting the second parameter based on the second frequency interval, wherein the second frequency interval may correspond to the change of the frequency of the fifth electronic signal caused by change of the first parameter during the second preset period.

For example, the electronic device may further comprise a first antenna (e.g., the first antenna array 442 of FIGS. 4 to 5) outputting wireless signal based on the fifth electronic signal, and is connected to the radio frequency circuit; a second antenna (e.g., the second antenna array 444 of FIGS. 4, 9, and/or 12) outputting a sixth electronic signal indicating reflection signal of the wireless signal; and a third frequency synthesizing circuit (e.g., the frequency synthesizing circuit 930 of FIG. 9 and/or FIG. 12) outputting a seventh electronic signal (e.g., reference signal 935 of FIG. 9) for converting a frequency of the sixth electronic signal to the frequency in the first preset frequency bandwidth, based on the second clock signal and the second parameter.

For example, the frequency of the wireless signal outputted from the first antenna may be changed to, from a first frequency, a second frequency greater than the first frequency based on the first parameter that is changed by multiple time sections respectively corresponding to the first preset period, in the second preset period, and wherein the frequency of the wireless signal outputted from the first antenna may be changed to, from the second frequency, the first frequency based on the second parameter when the second preset interval is expired.

For example, the electronic device may further comprise another radio frequency circuit (e.g., the second RF circuit 434 of FIG. 9) outputting an eighth electronic signal (e.g., the electronic signal 940 of FIG. 9) in the first preset frequency bandwidth by converting a frequency of the sixth electronic signal to the frequency of the first frequency bandwidth, based on the seventh electronic signal outputted from the third frequency synthesizing circuit; and another processor (e.g., the processor 120 of FIG. 4) different from the communication processor, wherein the another processor may be configured to identify, based on the eighth electronic signal, at least one of a distance between the electronic device and a subject corresponding to the reflection signal, or a speed of the subject.

For example, the communication processor may be configured to: transmit, to the first frequency synthesizing circuit in response to identifying expiration of a third preset period including the second preset period, a third parameter for compensating change of the frequency of the second electronic signal; change, in a state of transmitting the third parameter to the first frequency synthesizing circuit, the first parameter being changed in the third preset period based on the first parameter in a beginning moment of the third preset period; and cease, in response to identifying that the magnitude of the frequency of the second electronic signal is compensated in the state of the transmitting, transmitting of the third parameter to the first frequency synthesizing circuit.

For example, the first frequency synthesizing circuit may further comprising an oscillator (e.g., the oscillator 750 of FIG. 7) including an end, and another end where the second electronic signal having a frequency corresponding to a voltage of the end of the oscillator is outputted; and a switch (e.g., the switch 760 of FIG. 7) for selecting the voltage of the end of the oscillator between a first voltage based on the first clock signal and the first parameter, and a second voltage corresponding to a preset direct current (DC) voltage.

For example, the switch may be configured to: select, in a state receiving the third parameter from the communication processor, the voltage of the end of the oscillator as the second voltage among the first voltage and the second voltage; and select, in another state different from the state, the voltage of the end of the oscillator as the first voltage.

For example, the electronic device (e.g., the electronic device 101 of FIGS. 1 to 5) may comprise an intermediate frequency circuit outputting, by converting a frequency of a first electronic signal (e.g., the electric signal 540 of FIG. 5) included in a baseband bandwidth to a frequency in an intermediate frequency bandwidth indicated by a combination of a frequency of the first clock signal (e.g., the clock signal 521 of FIG. 5) and a first multiplier included in a first control signal (e.g., reference signal 524 of FIG. 5), a second electronic signal (e.g., reference signal 524 of FIG. 5); a radio frequency circuit (e.g., the first RF circuit 432 of FIG. 4 and/or FIG. 5) outputting, by converting a frequency of the second electronic signal to a frequency included in a radio frequency bandwidth, at least based on a combination of a frequency of the second clock signal (e.g., the clock signal 561 of FIG. 5) and a second multiplier included in a second control signal, a third electronic signal (e.g., the electronic signal 570 of FIG. 5); and a communication processor (e.g., the communication processor 410 of FIG. 4 and/or FIG. 5) outputting the first control signal to the intermediate frequency circuit (e.g., IF circuit 420 of FIG. 4 and/or FIG. 5), and outputting the second control signal (e.g., reference signal 565 of FIG. 5) to the radio frequency circuit, wherein the communication processor may be configured to: increase, in each of a plurality of first moments separated according to a first preset period, the first multiplier included in the first control signal by a first preset value, and decrease, in each of a plurality of second moments separated according to a second preset period longer than the first preset period, the second multiplier included in the second control signal by a second preset value different from the first preset value. Each processor herein may include processing circuitry.

For example, the communication processor may be configured to change, in each of the plurality of the second moments, a frequency of the third electronic signal, by using the second preset value corresponding to change of frequency of the third electronic signal at least based on the number of the first moments included in the second preset period and the first preset value.

For example, the communication processor (e.g., including processing circuitry) may be configured to increase, in a state inputting the first electronic signal based on a direct current voltage to the intermediate frequency circuit, the first multiplier included in the first control signal by the first preset value.

For example, the communication processor may be further configured to change, in each of one or more third moments distinguished by a preset third period that is greater than the second preset period and includes the plurality of first moments and the plurality of second moments, the first multiplier included in the first control signal to a preset multiplier indicating a preset frequency included in the intermediate frequency bandwidth.

For example, the intermediate frequency circuit may comprise a frequency synthesizing circuit outputting, based on the first clock signal and the first control signal, a fourth electronic signal indicating the frequency included in the intermediate frequency bandwidth; and a frequency mixer outputting the second electronic signal by combining the fourth electronic signal outputted from the frequency synthesizing circuit and the first electronic signal.

For example, the frequency synthesizing circuit may be configured to output the fourth electronic signal based on the first multiplier indicated based on a floating point format. The fourth electronic signal may be included in the first control signal.

For example, the radio frequency circuit may comprise a frequency synthesizing circuit that outputs, based on the second clock signal and the second control signal, a fifth electronic signal indicating the frequency included in the radio frequency bandwidth; and a frequency mixer outputs the third electronic signal by combining the fifth electronic signal and the second electronic signal.

For example, the radio frequency circuit may be configured to output the fifth electronic signal based on the second multiplier indicated based on one or more numeric values having an integer format. The fifth electronic signal may be included in the second control signal.

For example, the electronic device may further comprise a first antenna (e.g., the first antenna array 442 of FIGS. 4 to 5) outputting a wireless signal based on the third electronic signal, and a second antenna (e.g., the second antenna array 444 of FIGS. 4, 9, and/or 12) outputting a fourth electronic signal indicating a reflection signal of the wireless signal; another radio frequency circuit (e.g., the second RF circuit 434 of FIG. 9) outputs a fifth electronic signal, by converting a frequency of the fourth electronic signal at least based on a combination of the second clock signal and the second multiplier included in the second control signal, wherein the intermediate frequency circuit may be configured to output a sixth electronic signal, by converting a frequency of the fifth electronic signal to a frequency included in the baseband bandwidth, at least based on a combination of the first clock signal and the first multiplier.

For example, the electronic device may further comprise another processor (e.g., the processor 120 of FIG. 4) operably coupled to the communication processor (e.g., including processing circuitry), and wherein the communication processor may be further configured to transmit, to the another processor, information indicating a frequency of the sixth electronic signal.

For example, the another processor may be configured to obtain, in response to receiving the information, another information indicating at least one of a distance between a subject corresponding to the reflection signal and the electronic device, or a speed of the subject.

As described above, according to an embodiment, the method of the electronic device may comprise identifying (e.g., operation 1310 of FIG. 13), based on a first-time interval having a first period, a request to output a wireless signal for identifying a distance between the electronic device and the external object; adjusting (e.g., operations 1335 and 1345 of FIG. 13), in a state of outputting the wireless signal in response to identifying the request, the frequency of the wireless signal, according to expiration of a plurality of second time intervals included within the first-time interval and distinguished by a second period less than the first period, or expiration of a plurality of third time intervals distinguished by a third period less than the second period; and obtaining (e.g., operation 1355 of FIG. 13), in response to identifying an expiration of the first-time interval after outputting the wireless signal, distance between the electronic device and the external object, based on the reflection signal corresponding to the wireless signal, wherein the operation of adjusting the frequency of the wireless signal may comprise increasing (e.g., operation 1335 of FIG. 13), in response to identifying the expiration of each of the plurality of third time intervals, a frequency of a first electronic signal in an intermediate frequency bandwidth corresponding to the wireless signal, based on the preset frequency interval, and changing (e.g., operation 1345 of FIG. 13), in response to identifying the expiration of each of the plurality of second time intervals, a frequency of the second electronic signal corresponding to the wireless signal and obtained by changing the frequency of the first electronic signal to a frequency of a radio frequency bandwidth, to a preset frequency included in the radio frequency bandwidth.

For example, in response to identifying that the plurality of second time section or the plurality of third time section expire, the operation of adjusting the frequency of the wireless signal may further include an operation of increasing a counter stored in a register of the communication processor of the electronic device (e.g., operation 1425 of FIG. 14).

For example, the first time section may correspond to a time section in which the second time section are combined by a first preset number of times, and the second time section may correspond to a second preset number of times in which the third time section are combined by the first preset number.

As described above, according to an embodiment, the method of an electronic device may comprise increasing, in each of a plurality of first moments separated according to a first preset period, a first multiplier included in a first control signal by a first preset value. The intermediate frequency circuit may be configured to output, by converting a frequency of a first electronic signal included in a baseband bandwidth to a frequency in an intermediate frequency bandwidth indicated by a combination of a frequency of a first clock signal and the first multiplier included in the first control signal, a second electronic signal. The method comprises decreasing, in each of a plurality of second moments separated according to a second preset period longer than the first preset period, a second multiplier included in a second control signal by a second preset value different from the first preset value. The second control signal is inputted to a radio frequency circuit configured to output, by converting a frequency of the second electronic signal to a frequency included in a radio frequency bandwidth, at least based on a combination of a frequency of a second clock signal and the second multiplier included in the second control signal, a third electronic signal.

For example, the method may further comprises changing, in each of the plurality of the second moments, a frequency of the third electronic signal, by using the second preset value corresponding to change of frequency of the third electronic signal at least based on the number of the first moments included in the second preset period and the first preset value.

For example, the increasing of the method may further comprises increasing, in a state inputting the first electronic signal based on a direct current voltage to the intermediate frequency circuit, the first multiplier included in the first control signal by the first preset value.

For example, the method may further comprises changing, in each of one or more third moments distinguished by a preset third period that is greater than the second preset period and includes the plurality of first moments and the plurality of second moments, the first multiplier included in the first control signal to a preset multiplier indicating a preset frequency included in the intermediate frequency bandwidth.

For example, the method may further comprises controlling the intermediate frequency circuit. The controlling of the method may comprise outputting, from a frequency synthesizing circuit included in the intermediate frequency circuit, based on the first clock signal and the first control signal, a fourth electronic signal indicating the frequency included in the intermediate frequency bandwidth. The controlling of the method may comprise outputting, from a frequency mixer included in the intermediate frequency circuit, the second electronic signal by combining the fourth electronic signal outputted from the frequency synthesizing circuit and the first electronic signal.

For example, the method further comprises outputting, from the frequency synthesizing circuit, the fourth electronic signal based on the first multiplier indicated based on a floating point format, the fourth electronic signal being included in the first control signal.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means (e.g., memory) in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device, comprising:
a first frequency synthesizing circuit configured to output a second electronic signal for converting a frequency of a first electronic signal to a frequency in a first preset frequency bandwidth, based on a first clock signal;
a second frequency synthesizing circuit configured to output a fourth electronic signal for converting a frequency of a third electronic signal obtained from the first electronic signal at least based on the second electronic signal to a frequency in a second preset frequency bandwidth different from the first preset frequency bandwidth, based on a second clock signal different from the first clock signal; and
a communication processor operably coupled to the first frequency synthesizing circuit and the second frequency synthesizing circuit,
wherein the communication processor is configured to:
control to transmit, to the first frequency synthesizing circuit, a first parameter indicating a frequency of the second electronic signal based on a frequency of the first clock signal, and changing based on a first preset frequency interval according to a first preset period; and
control to transmit, to the second frequency synthesizing circuit, a second parameter indicating a frequency of the fourth electronic signal based on a frequency of the second clock signal, and changing based on a second preset frequency interval different from the first preset frequency interval.

2. The electronic device of claim 1, further comprising:
an intermediate frequency circuit configured to output the third electronic signal, by converting the frequency of the first electronic signal to the frequency in the first preset frequency bandwidth associated with an intermediate frequency bandwidth, based on the second electronic signal output from the first frequency synthesizing circuit; and
a radio frequency circuit configured to output a fifth electronic signal, by converting a frequency of the third electronic signal to the frequency in the second preset frequency bandwidth associated with a radio frequency bandwidth, based on the fourth electronic signal output from the second frequency synthesizing circuit.

3. The electronic device of claim 2, wherein the communication processor is further configured to compensate change of a frequency of the fifth electronic signal by adjusting the second parameter based on the second frequency interval, wherein the second frequency interval corresponds to the change of the frequency of the fifth electronic signal caused by change of the first parameter during the second preset period.

4. The electronic device of claim 2, further comprising:
a first antenna configured to output a wireless signal based on the fifth electronic signal, and connected to the radio frequency circuit;
a second antenna configured to output a sixth electronic signal indicating reflection signal of the wireless signal; and
a third frequency synthesizing circuit configured to output a seventh electronic signal for converting a frequency of the sixth electronic signal to the frequency in the first preset frequency bandwidth, based on the second clock signal and the second parameter.

5. The electronic device of claim 4, wherein a frequency of the wireless signal outputted from the first antenna is changed to, from a first frequency, a second frequency greater than the first frequency based on the first parameter that is changed by multiple time sections respectively corresponding to the first preset period, in the second preset period, and
wherein the frequency of the wireless signal outputted from the first antenna is changed to, from the second frequency, the first frequency based on the second parameter when the second preset interval is expired.

6. The electronic device of claim 4, further comprising:
another radio frequency circuit configured to output an eighth electronic signal in the first preset frequency bandwidth by converting a frequency of the sixth electronic signal to the frequency of the first frequency bandwidth, based on the seventh electronic signal outputted from the third frequency synthesizing circuit; and
another processor different from the communication processor,
wherein the another processor is configured to identify, based on the eighth electronic signal, at least one of a distance between the electronic device and a subject corresponding to the reflection signal, or a speed of the subject.

7. The electronic device of claim 1, wherein the communication processor is further configured to:
transmit, to the first frequency synthesizing circuit in response to identifying expiration of a third preset period including the second preset period, a third parameter for compensating change of the frequency of the second electronic signal;

change, in a state of transmitting the third parameter to the first frequency synthesizing circuit, the first parameter being changed in the third preset period based on the first parameter in a beginning moment of the third preset period; and cease, in response to identifying that the magnitude of the frequency of the second electronic signal is compensated in the state of the transmitting, transmitting of the third parameter to the first frequency synthesizing circuit.

8. The electronic device of claim 7, wherein the first frequency synthesizing circuit further comprises:

an oscillator including an end, and another end where the second electronic signal having a frequency corresponding to a voltage of the end of the oscillator is outputted; and a switch configured for selecting the voltage of the end of the oscillator between a first voltage based on the first clock signal and the first parameter, and a second voltage corresponding to a preset direct current (DC) voltage.

9. The electronic device of claim 8, wherein the switch is further configured to:

select, in a state of receiving the third parameter from the communication processor, the voltage of the end of the oscillator as the second voltage among the first voltage and the second voltage; and select, in another state different from the state, the voltage of the end of the oscillator as the first voltage.

10. An electronic device, comprising:

an intermediate frequency circuit configured to output, by converting a frequency of a first electronic signal included in a baseband bandwidth to a frequency in an intermediate frequency bandwidth indicated by a combination of a frequency of a first clock signal and a first multiplier included in a first control signal, a second electronic signal;

a radio frequency circuit configured to output, by converting a frequency of the second electronic signal to a frequency included in a radio frequency bandwidth, at least based on a combination of a frequency of a second clock signal and a second multiplier included in a second control signal, a third electronic signal; and a communication processor configured to output the first control signal to the intermediate frequency circuit, and output the second control signal to the radio frequency circuit, wherein the communication processor is further configured to:

increase, in each of a plurality of first moments separated according to a first preset period, the first multiplier included in the first control signal by a first preset value, and decrease, in each of a plurality of second moments separated according to a second preset period longer than the first preset period, the second multiplier included in the second control signal by a second preset value different from the first preset value.

11. The electronic device of claim 10, wherein the communication processor is further configured to change, in each of the plurality of the second moments, a frequency of the third electronic signal, by using the second preset value corresponding to change of frequency of the third electronic signal at least based on the number of the first moments included in the second preset period and the first preset value.

12. The electronic device of claim 10, wherein the communication processor is further configured to increase, in a state inputting the first electronic signal based on a direct current voltage to the intermediate frequency circuit, the first multiplier included in the first control signal by the first preset value.

13. The electronic device of claim 10, wherein the communication processor is further configured to change, in each of one or more third moments distinguished by a preset third period that is greater than the second preset period and includes the plurality of first moments and the plurality of second moments, the first multiplier included in the first control signal to a preset multiplier indicating a preset frequency included in the intermediate frequency bandwidth.

14. The electronic device of claim 10, wherein the intermediate frequency circuit comprises:

a frequency synthesizing circuit configured to output, based on the first clock signal and the first control signal, a fourth electronic signal indicating the frequency included in the intermediate frequency bandwidth; and a frequency mixer configured to output the second electronic signal by combining the fourth electronic signal outputted from the frequency synthesizing circuit and the first electronic signal.

15. The electronic device of claim 14, wherein the frequency synthesizing circuit is further configured to output the fourth electronic signal based on the first multiplier indicated based on a floating point format, the fourth electronic signal being included in the first control signal.

16. The electronic device of claim 10, wherein the radio frequency circuit comprises:

a frequency synthesizing circuit configured to output, based on the second clock signal and the second control signal, a fifth electronic signal indicating the frequency included in the radio frequency bandwidth; and a frequency mixer configured to output the third electronic signal by combining the fifth electronic signal and the second electronic signal.

17. The electronic device of claim 16, wherein the radio frequency circuit is further configured to output the fifth electronic signal based on the second multiplier indicated based on one or more numeric values having an integer format, the fifth electronic signal being included in the second control signal.

18. The electronic device of claim 10, further comprising:

a first antenna configured to output a wireless signal based on the third electronic signal;

a second antenna configured to output a fourth electronic signal indicating a reflection signal of the wireless signal; and another radio frequency circuit configured to output a fifth electronic signal, by converting a frequency of the fourth electronic signal at least based on a combination of the second clock signal and the second multiplier included in the second control signal, wherein the intermediate frequency circuit is configured to output a sixth electronic signal, by converting a frequency of the fifth electronic signal to a frequency included in the baseband bandwidth, at least based on a combination of the first clock signal and the first multiplier.

19. The electronic device of claim 18, further comprising:
another processor operably coupled to the communication
    processor,
and wherein the communication processor is further con-
    figured to transmit, to the another processor, information indicating a frequency of the sixth electronic
    signal.

20. The electronic device of claim 19, wherein the another
processor is further configured to obtain, in response to
receiving the information, another information indicating at least one of a distance between a subject corresponding to
the reflection signal and the electronic device, or a speed of
the subject.

\*   \*   \*   \*   \*